(12) United States Patent
Yoshioka

(10) Patent No.: US 8,761,521 B2
(45) Date of Patent: Jun. 24, 2014

(54) STILL IMAGE VERIFYING APPARATUS AND METHOD

(75) Inventor: Takashi Yoshioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 501 days.

(21) Appl. No.: 13/074,432

(22) Filed: Mar. 29, 2011

(65) Prior Publication Data

US 2011/0243458 A1 Oct. 6, 2011

(30) Foreign Application Priority Data

Mar. 31, 2010 (JP) ................................. 2010-084568

(51) Int. Cl.
*G06K 9/62* (2006.01)

(52) U.S. Cl.
USPC ........................................................ 382/209

(58) Field of Classification Search
None
See application file for complete search history.

(56) References Cited

U.S. PATENT DOCUMENTS

| 2005/0180594 | A1 | 8/2005 | Isogai |
| 2008/0256362 | A1 | 10/2008 | Takenaka et al. |
| 2008/0292267 | A1 | 11/2008 | Yamada et al. |
| 2010/0023961 | A1* | 1/2010 | Kim ................................ 725/22 |

FOREIGN PATENT DOCUMENTS

| JP | 2001-285614 | 10/2001 |
| JP | 2006-74690 | 3/2006 |
| JP | 3944490 | 7/2007 |
| JP | 2008-178048 | 7/2008 |

OTHER PUBLICATIONS

Izu, T. et al. A Sanitizable Signature Scheme with Aggregation. ISPEC 2007, LNCS 4464, pp. 51-64 2007.*
T. Izu, N. Kanaya, M. Takenaka and T. Yoshioka, "PIATS: A Partially Sanitizable Signature Scheme", ICICS 2005, LNCS 3783, pp. 72-83, Springer-Verlag, 2005.*
R. Steinfeld, L. Bull and Y. Zheng, "Content Extraction Signatures", ICISC 2001, LNCS 2288, pp. 285-304, Springer-Verlag, 2001.*
R. Deng et al. Achieving End-toEnd Authentication in intermediary-enabled Multimedia delivery systems. ISPEX 2007, LNCS 4464, pp. 284-300, 2007.*
R. Du et. al. "Lossless authentication of mpeg-2 video", IEEE ICIP 2002, MTL, Inc. Beavercreek, Ohio.*
U.S. Appl. No. 12/971,418, filed Dec. 17, 2010, Takashi Yoshioka, Fujitsu Limited.

* cited by examiner

*Primary Examiner* — Atiba O Fitzpatrick
*Assistant Examiner* — Thomas A James
(74) *Attorney, Agent, or Firm* — Staas & Halsey LLP

(57) ABSTRACT

A still image verifying apparatus includes, a storage unit that stores a plurality of pieces of summary information generated respectively from a plurality of pieces of still image data, a recording unit that records edited image data obtained by performing an edit process on still image data, and a still image decoding unit that generates decoded still image data by retrieving from the recording unit. The apparatus includes a still image determining unit that determines whether the generated decoded still image data matches the edited image data, a digest generating unit that generates summary information by retrieving from the recording unit, a digest information verifying unit that retrieves summary information corresponding to the edited image data and compares the generated summary information with the retrieved summary information and an edited still image verifying unit that verifies the authenticity of the edited image data.

15 Claims, 30 Drawing Sheets

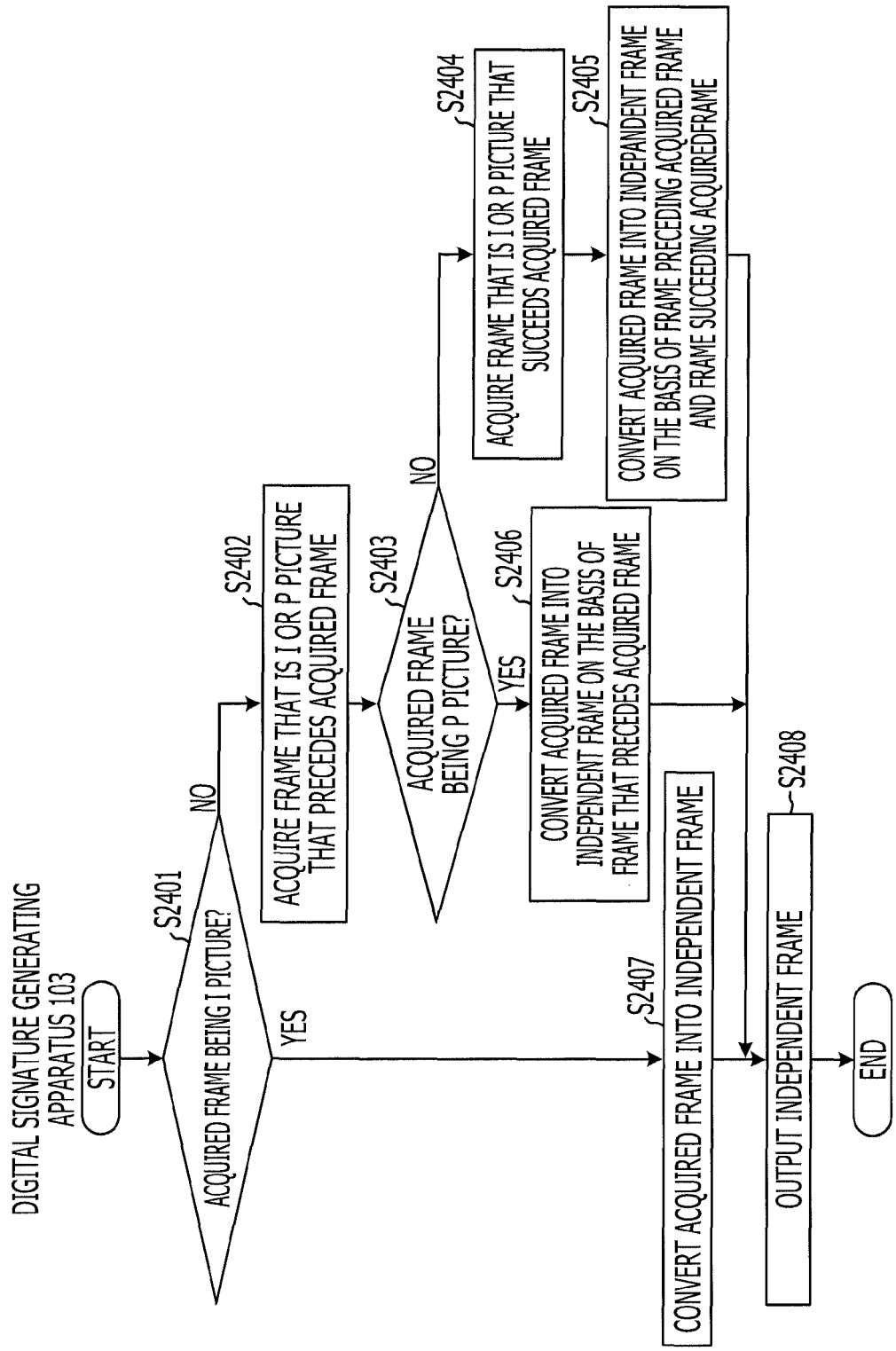

STILL IMAGE VERIFYING APPARATUS AND METHOD

CROSS-REFERENCE TO RELATED APPLICATIONS

This application is based upon and claims the benefit of priority of the prior Japanese Patent Application No. 2010-84568, filed on Mar. 31, 2010, the entire contents of which are incorporated herein by reference.

FIELD

The embodiments discussed herein are related to an apparatus and method for verifying a still image.

BACKGROUND

In recent years, it has been general practice to install security cameras in shops, downtown areas, housing complexes and the like and install vehicle drive recorders or the like in commercial vehicles. The number of cases in which video images are used as material evidence has increased. A store typically records and maintains a conversation carried out between an operator of the store and a customer as evidence including in case any problem arises later from discussion over the telephone or in relation to subsequent support operations.

If a video image or sound is used as evidence, a video tape, an image and sound file are directly submitted as it is. If the digital technique handing the image and sound storage advances further, editing and alteration are easy to do. To use the video image as evidence, the data needs to be endorsed with a digital signature or a time stamp by a third party. Currently, services and products are commercially available to record the voice of an operator speaking on the telephone with a time stamp attached thereto. The need for such a technique is expected to increase from in the future.

A typical technique of detecting any alternation by a third party is to split the content of a digital document according to items, determine summary information of each item, and attach a digital signature to the set of summary information of each item. The summary information, also referred to as a message digest, is hash information that is calculated using a cryptographic one-way hash function. This technique is applied to video image data such that originality of the video image data is assured, and such that data is extracted from a signed document with privacy protected (for example, Japanese Laid-Open Patent Publication No. 2008-178048).

Since video data is typically large in size, a variety of compression techniques are used. A typical interframe prediction technique is available as one of the compression techniques. For example, the interframe prediction technique is used in the motion picture expert group (MPEG)-1 format of compression video data. Three types of images, I picture, P picture, and B picture are stored. The I picture includes all images needed to display video. The P picture includes a difference between the past I and P pictures. The B picture includes a difference between past/future I pictures and the P picture. Since the P and B pictures include differences between prior images and subsequent images, a high data compression rate is achieved.

A large amount of process is needed to decode video data based on the interframe prediction technique. A frame as the I picture is thus extracted, and encoded into a still image on a per frame basis. The video data is thus played quickly (as described in Japanese Laid-Open Patent Publication No. 2006-74690).

SUMMARY

According to an aspect of an embodiment, a still image verifying apparatus includes a storage unit that stores a plurality of pieces of summary information generated respectively from a plurality of pieces of still image data, the plurality of pieces of still image data obtained by encoding a plurality of pieces of image data forming video image data in accordance with an image format, and a recording unit that records edited image data obtained by performing an edit process on still image data selected from the plurality of pieces of still image data, position information of a still image of the selected still image data on the video image data, the selected still image data, and edit information representing content of the edit process.

According to an embodiment, the still image verifying apparatus includes a still image decoding unit that generates, to implement verification of an authenticity of the edited image data, decoded still image data by retrieving from the recording unit the still image data corresponding to the edited image data and the edit information, and by performing a restoration process on the still image data in accordance with the edit information, a still image determining unit that determines whether the generated decoded still image data matches the edited image data as a verification target by comparing the generated decoded still image data with the edited image data, and a digest generating unit that generates summary information by retrieving from the recording unit the still image data corresponding to the edited image data as the verification target According to an embodiment, the still image verifying apparatus includes a digest information verifying unit that retrieves, from the recording unit in accordance with the position information stored, summary information corresponding to the edited image data guaranteeing originality and comparing the generated summary information with the retrieved summary information to determine whether the generated summary information matches the retrieved summary information, and an edited still image verifying unit that verifies the authenticity of the edited image data based on the verification results of the digest information verifying unit and the determination results of the still image determining unit.

Objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 24 is a flowchart illustrating an independent frame generating process;

FIG. 25B is a continuation of FIG. 25A;

DETAILED DESCRIPTION

Figure 1:
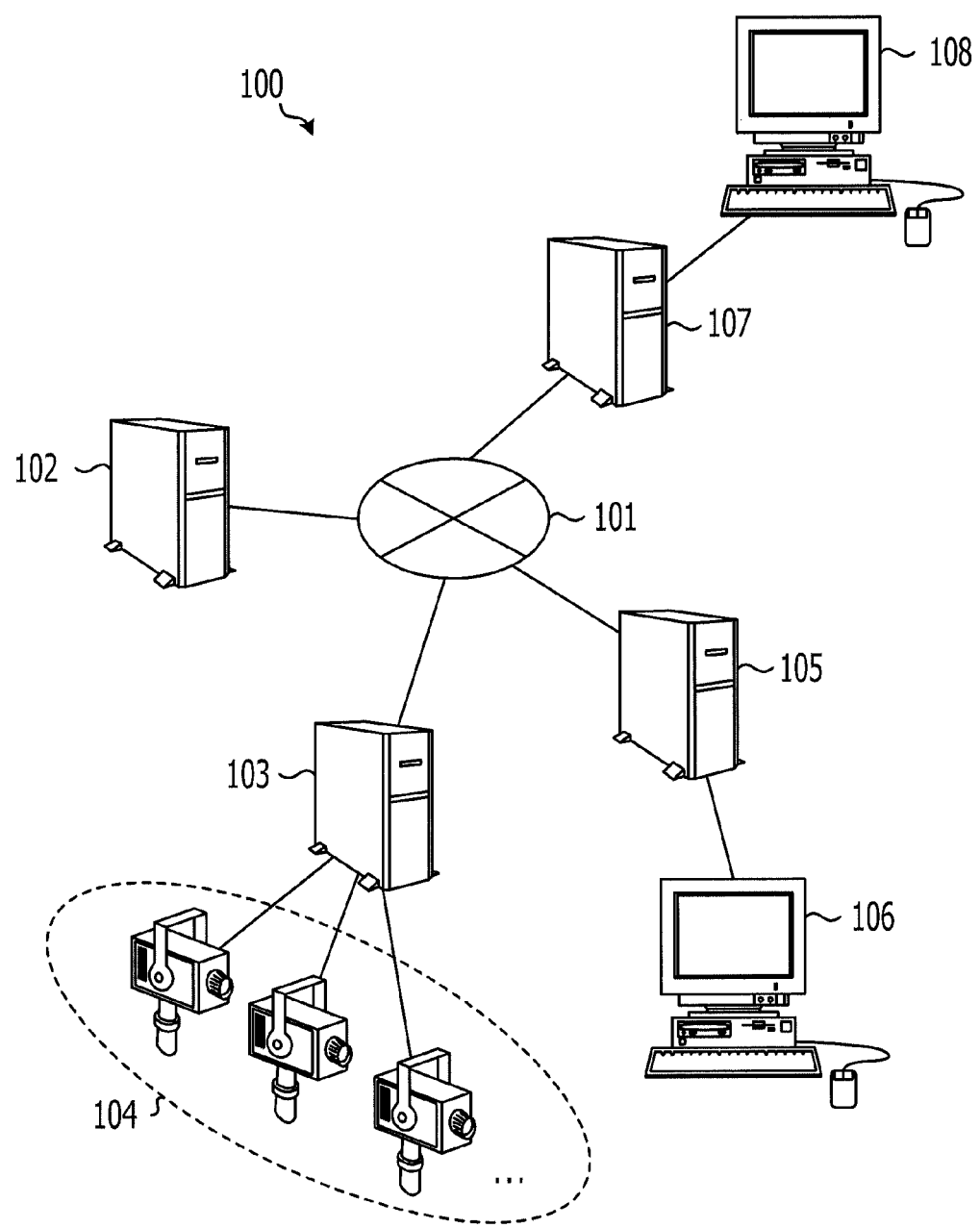
FIG. 1 is a diagram illustrating an example of a schematic configuration of a system.

Reference will now be made in detail to the embodiments, examples of which are illustrated in the accompanying drawings, wherein like reference numerals refer to the like elements throughout. The embodiments are described below to explain the present invention by referring to the figures.

A still image verifying apparatus, a still image verifying method, and a still image verifying program as embodiments of the invention are described in detail below with reference to the attached drawings.

FIG. 1 illustrates a configuration of a digital signature system 100 of one embodiment. The digital signature system 100 includes authenticating apparatus 102, digital signature generating apparatus 103, video extracting apparatus 105, and still image verifying apparatus 107. The digital signature system 100 may be connected to a network 101. The digital signature generating apparatus 103 is connected to a plurality of video image recording terminals 104. The video extracting apparatus 105 is connected to an extractor's terminal 106. The still image verifying apparatus 107 is connected to a verifying terminal 108.

The network 101 is a communication network such as the Internet, an intranet, or a wide-area network, etc. The authenticating apparatus 102 is a server of a certificate authority managing digital signature information. A digital signature is information that is obtained by encrypting summary information summarizing a signing target with a private key held by a transmitting apparatus. The transmitting apparatus transmits the digital signature, the signing target, and a public key certificate to a receiving apparatus. After verifying the validity of the public key certificate, the receiving apparatus decrypts the encrypted digital signature with a public key included in the public key certificate, and compares the digital signature with the summary information obtained from the signing target. Depending on whether the two pieces of information are identical to each other, the receiving apparatus determines whether the information has been transmitted by an authentic partner. The process is described below in detail with reference to FIG. 21.

The summary information may be hash information that is calculated by applying a cryptographic one-way hash function to the signing target. The summary information is also referred to as a message digest in the context that the signing target is compressed in size. The hash information generated through the cryptographic one-way hash function is unique information that can be generated cryptographically from only the signing target. The original information is difficult to restore from the generated hash information.

The hash information is frequently used in the encryption of information and the generating of the digital signature for the above-described reason. The cryptographic one-way hash function includes algorithms such as message digest 5 (MD5), secure hash algorithm (SHA) SHA-1, or SHA-256. The public key certificate includes information about a hash information generating algorithm. The hash information generating algorithm is an algorithm according to which the summary information is generated. While hash information or function is described herein in detail, the present invention is not limited to any particular procedure or function to execute a process relative to the data. For example, any procedure that converts large amount of data into a state that enables retrieval of the data using an index may be used.

The digital signature generating apparatus 103 is a server that accumulates and stores information transmitted from the video image recording terminal 104 and generates the digital signature. The video image recording terminal 104 is a terminal that captures (photographs) and records information serving as a target to be digitally signed, i.e., original data (hereinafter referred to as original video image information). For example, the video image recording terminal 104 is a handy type video camera, or a business-purpose surveillance camera. The video image recording terminal 104 may communicate with the digital signature generating apparatus 103. The video image recording terminal 104 and the digital signature generating apparatus 103 communicate with each other through removable recording media loaded thereon, or via a dedicated cable therebetween such as a universal serial bus (USB) cable or an IEEE 1394 cable.

The video extracting apparatus 105 is a server that accumulates information transmitted from the digital signature generating apparatus 103. The video extracting apparatus 105 is operated by the extractor's terminal 106 to be discussed below. The video extracting apparatus 105 may be operated directly by a mouse, a keyboard, a display or the like connected thereto. The extractor's terminal 106 is a terminal used to operate the video extracting apparatus 105. The extractor's terminal 106 may communicate with the video extracting apparatus 105.

The still image verifying apparatus 107 is a server that accumulates information transmitted from the video extracting apparatus 105 and verifies the digital signature attached to the transmitted information. The still image verifying apparatus 107 is operated by the verifying terminal 108 to be discussed below. The still image verifying apparatus 107 may be directly operated by a mouse, a keyboard, a display, or the like connected thereto. The verifying terminal 108 is a terminal used to operate the still image verifying apparatus 107. The verifying terminal 108 may communicate with the still image verifying apparatus 107. While particular examples of the components of the system 100 are described herein, the present invention is not limited to any particular type or number of components and any of the operations may be implemented by one or more of the components.

Figure 2:
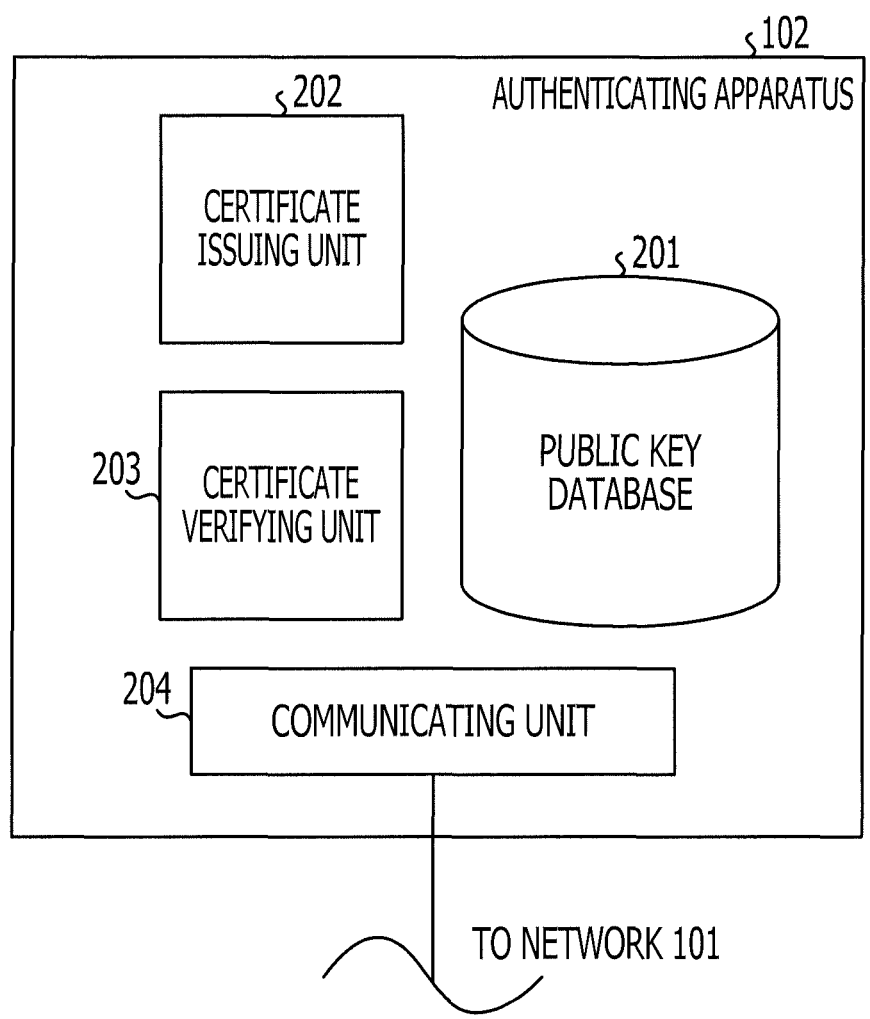
FIG. 2 is a block diagram of an authenticating apparatus.

FIG. 2 is a functional block diagram of the authenticating apparatus 102. The authenticating apparatus 102 includes public key database (DB) 201, certificate issuing unit 202, certificate verifying unit 203, and communicating unit 204. The public key DB 201 accumulates public keys of the video image recording terminal 104, and the extractor's terminal 106. The certificate issuing unit 202 issues a public key certificate in response to a request. The certificate verifying unit 203 verifies the public key certificate. The communicating unit 204, connected to the network 101, performs communications via the network 101.

Figure 3:
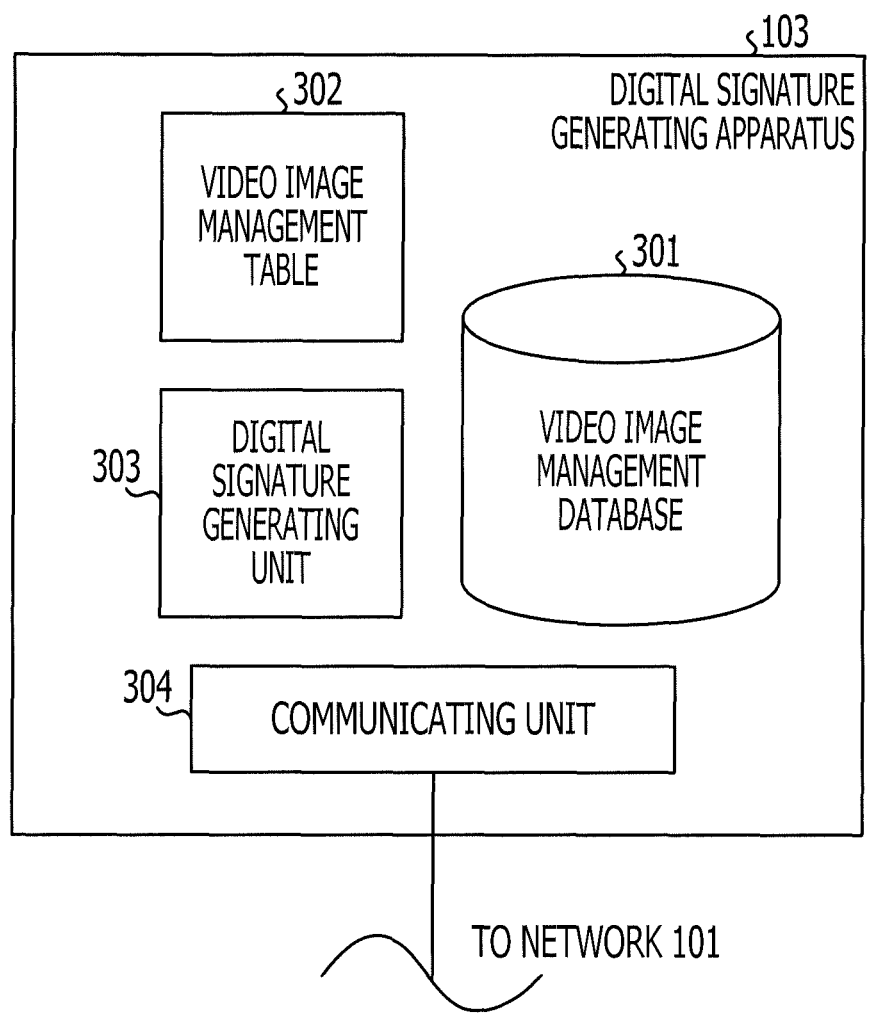
FIG. 3 is a block diagram of a digital signature generating apparatus.

FIG. 3 is a functional block diagram of the digital signature generating apparatus 103. The digital signature generating apparatus 103 includes video image management DB 301, video image management table (TB) 302, digital signature generator unit 303, and communicating unit 304. The video image management DB 301 stores information received from the video image recording terminal 104, and information transmitted to the video extracting apparatus 105. The video image management TB 302 is a table managing access control to the video image management DB 301. The digital signature generator unit 303 adds a digital signature and a signing target thereof to video data. The function of the digital signature generator unit 303 is described below in detail with reference to FIG. 7. The communicating unit 304, connected to the network 101, performs communications via the network 101.

Figure 4:
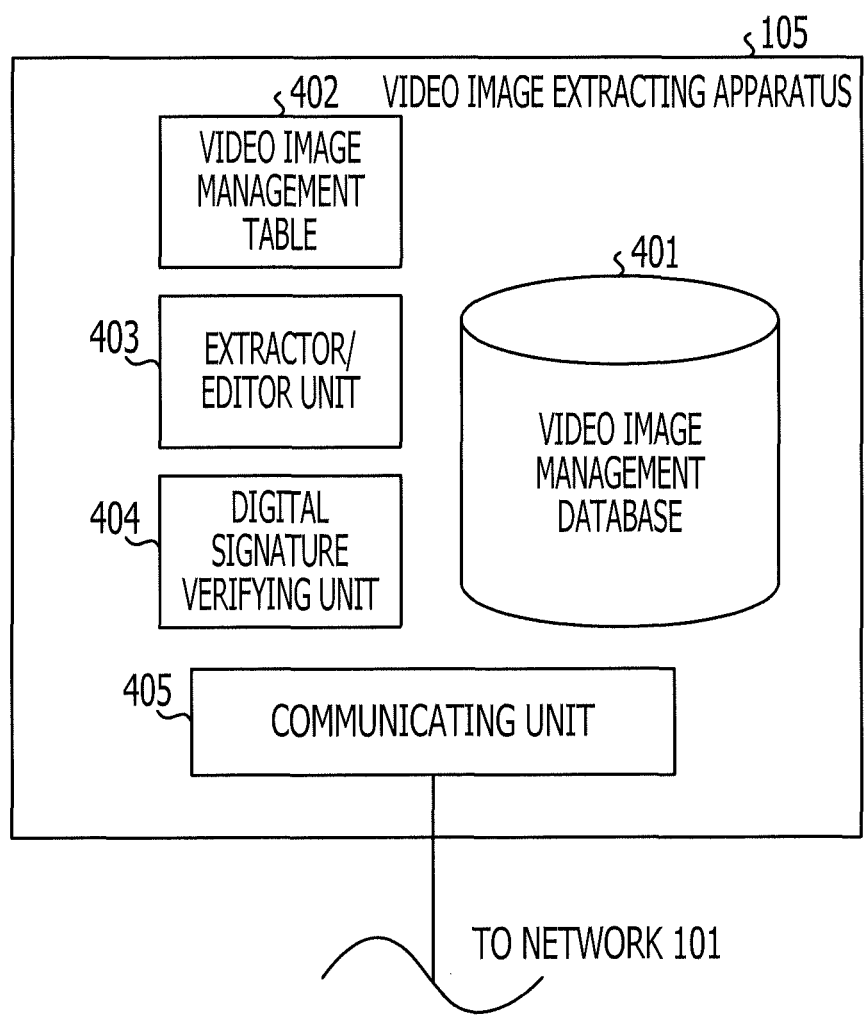
FIG. 4 is a block diagram of a video image extracting apparatus.

FIG. 4 is a functional block diagram of the video extracting apparatus 105. The video extracting apparatus 105 includes video image management DB 401, video image management TB 402, extractor/editor unit 403, digital signature verifying unit 404, and communicating unit 405. The video image management DB 401 stores information received from the digital signature generating apparatus 103. The video image management TB 402 is a table managing access control to the video image management DB 401. The extractor/editor unit 403 extracts part of still images from a video, and edits the extracted still image as necessary. The digital signature verifying unit 404 verifies the digital signature attached to information received from the digital signature generating apparatus 103. The communicating unit 405, connected to the network 101, performs communications via the network 101.

Figure 5:
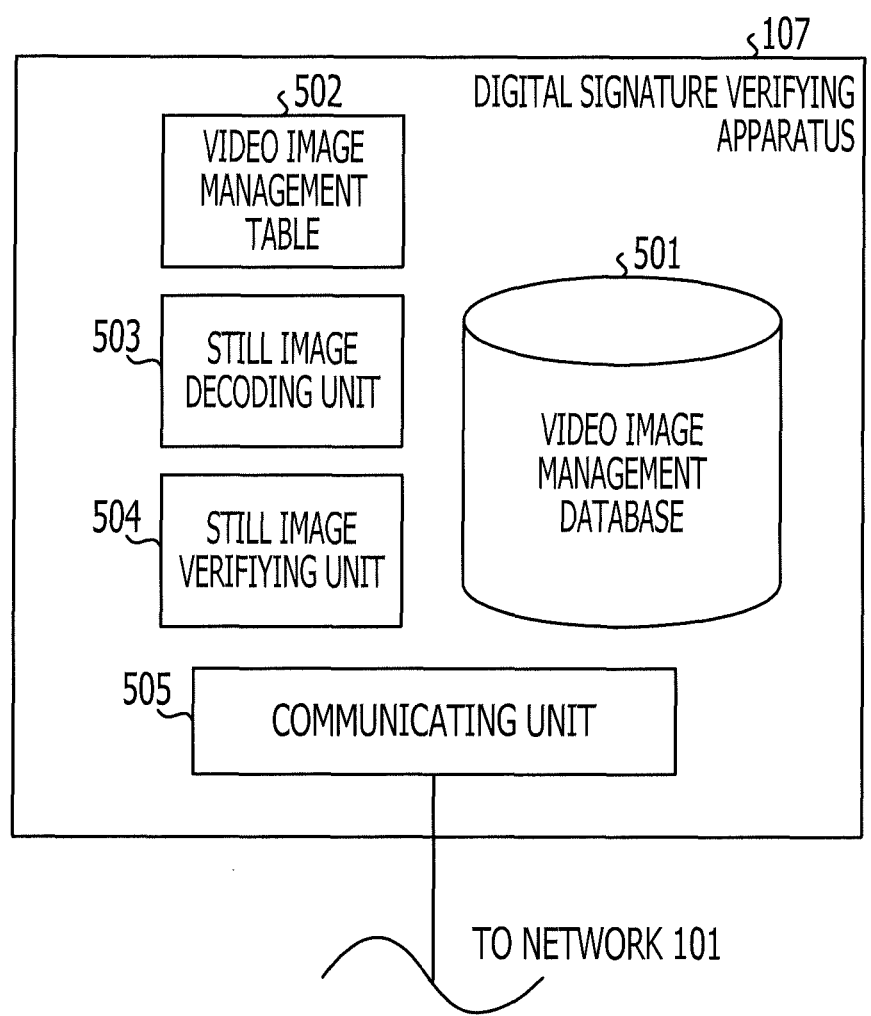
FIG. 5 is a block diagram of a still image verifying apparatus.

FIG. 5 is a functional block diagram of the still image verifying apparatus 107. The still image verifying apparatus 107 includes video image management DB 501, video image management TB 502, still image decoding unit 503, still image verifying unit 504, and communicating unit 505. The video image management DB 501 stores information received from the video extracting apparatus 105. The video image management TB 502 is a table managing access control to the video image management DB 501. The decoding unit 503 restores a still image using edit information. More specifically, the decoding unit 503 notifies a software program having performed an edit process of a command or an event caused in response to the edit information, and causes the still image to be decoded by the software program. The still image verifying unit 504 verifies an edited still image to be attached to the information received from the video extracting apparatus 105. The communicating unit 505, connected to the network 101, performs communications via the network 101.

Although the digital signature generating apparatus 103 is connected to the network 101 as described above, the digital signature generating apparatus 103 may be operated on an off-line basis. More specifically, the public key certificate generated by the authenticating apparatus 102 may be written onto a removable medium such as a flexible disk or a compact disc (CD). Later, the digital signature generating apparatus 103 reads the public key certificate vie a magnetic disk drive 604 or a magnetic disk 606 of FIG. 6 to be discussed below.

Similarly, when digitally signed, the video data is stored on a storage area of the digital signature generating apparatus 103, and video data and the digital signature thereof are periodically written onto the removable medium. The video extracting apparatus 105 may read the video data and the digital signature onto a removable medium thereof.

Figure 6:
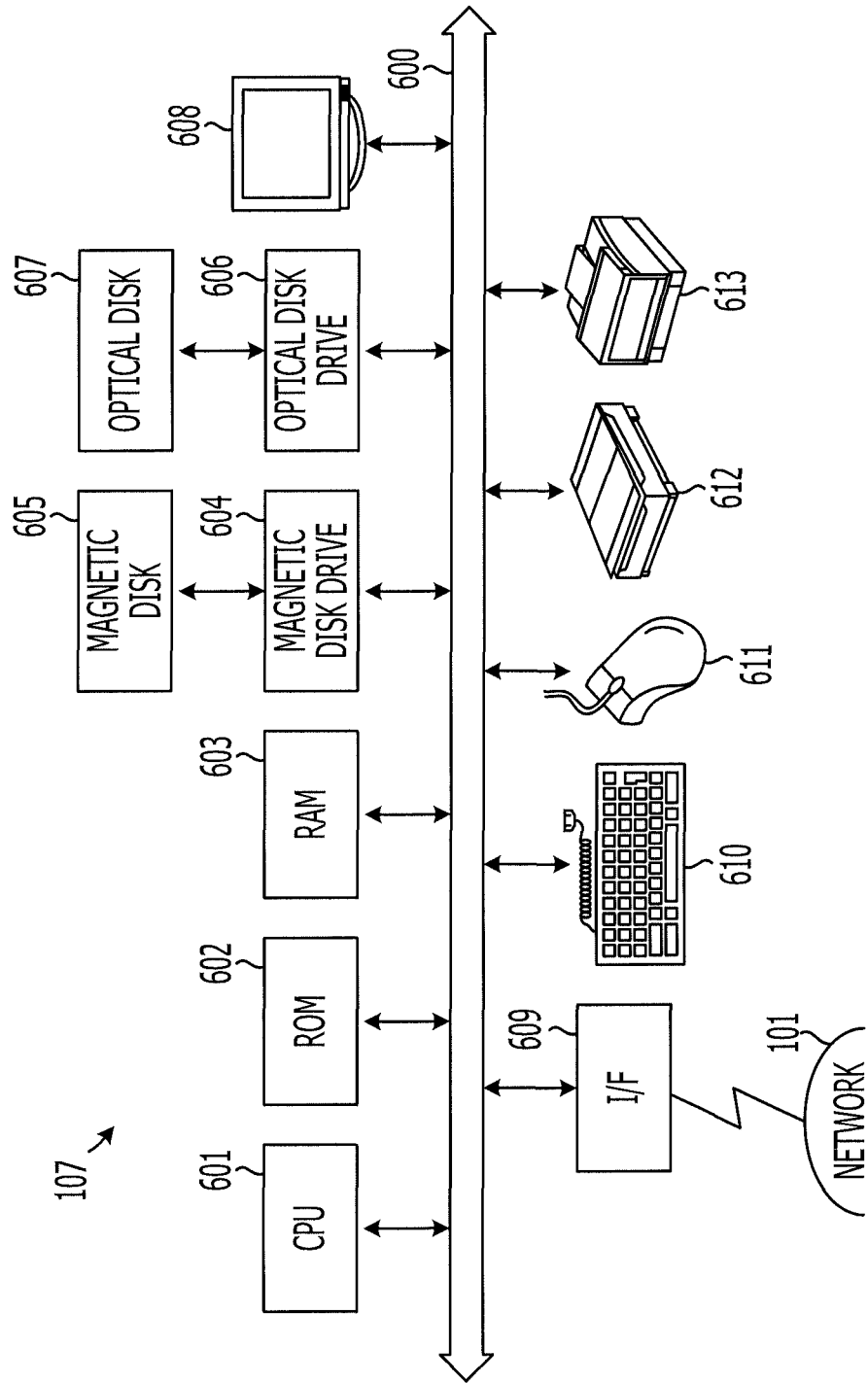
FIG. 6 is a hardware configuration diagram of a still image verifying apparatus.

FIG. 6 illustrates a hardware configuration of the still image verifying apparatus 107. As illustrated in FIG. 6, the still image verifying apparatus 107 includes central processing unit (CPU) 601, read-only memory (ROM) 602, and random-access memory (RAM) 603. The still image verifying apparatus 107 further includes magnetic disk drive 604, magnetic disk 605, optical disk drive 606, and optical disk 607. The still image verifying apparatus 107 further includes display 608, interface (I/F) 609, keyboard 610, mouse 611, scanner 612, and printer 613. Those units are connected to each other via a bus 600.

The CPU 601 generally controls the still image verifying apparatus 107. The ROM 602 stores a variety of computer programs such as a boot program. The RAM 603 is used as a work area of the CPU 601. The magnetic disk drive 604 under the control of the CPU 601 controls read/write operations on the magnetic disk 605. The magnetic disk 605 stores data written under the control of the magnetic disk drive 604.

The optical disk drive 606 under the control of the CPU 601 controls read/write operations of data to the optical disk 607. The optical disk 607 stores data written under the control of the optical disk drive 606 and causes the computer to read the data stored on the optical disk 607.

The display 608 displays a cursor, an icon, and a toolbox. The display 608 also displays data such as a document, an image, and functional information. The display 608 may include a cathode-ray tube (CRT), a thin-film transistor (TFT) liquid-crystal display, or a plasma display.

The interface 609, connected to the network 101, is connected to another apparatus via the network 101. The interface 609 serves as an interface between the network 101 and the internal units of the still image verifying apparatus 107. The interface 609 controls outputting and inputting of data to and from the external apparatus. A modem or a LAN adaptor may be used for the interface 609.

The keyboard 610 includes keys for inputting characters, numerals, and a variety of instructions, and thus inputs data. The keyboard 610 may include a touchpanel input pad or touchpad numerical keys. The mouse 611 is used to move a cursor, to set a range on a screen, to move a window, or modify a size of the window. A trackball or a joystick with a function of a pointing device may be used for the mouse 611.

The scanner 612 optically reads an image, and retrieves image data into the still image verifying apparatus 107. The scanner 612 may have a function of an optical character reader (OCR). The printer 613 prints output image data and text data. A laser printer or an ink-jet printer may be used for the printer 613.

The digital signature generating apparatus 103 may also have a hardware configuration identical to that of the still image verifying apparatus 107. More specifically, the digital signature generating apparatus 103 includes CPU, ROM, RAM, magnetic disk drive, magnetic disk, optical disk drive, optical disk, display, interface, keyboard, mouse, scanner, and printer.

Figure 7:
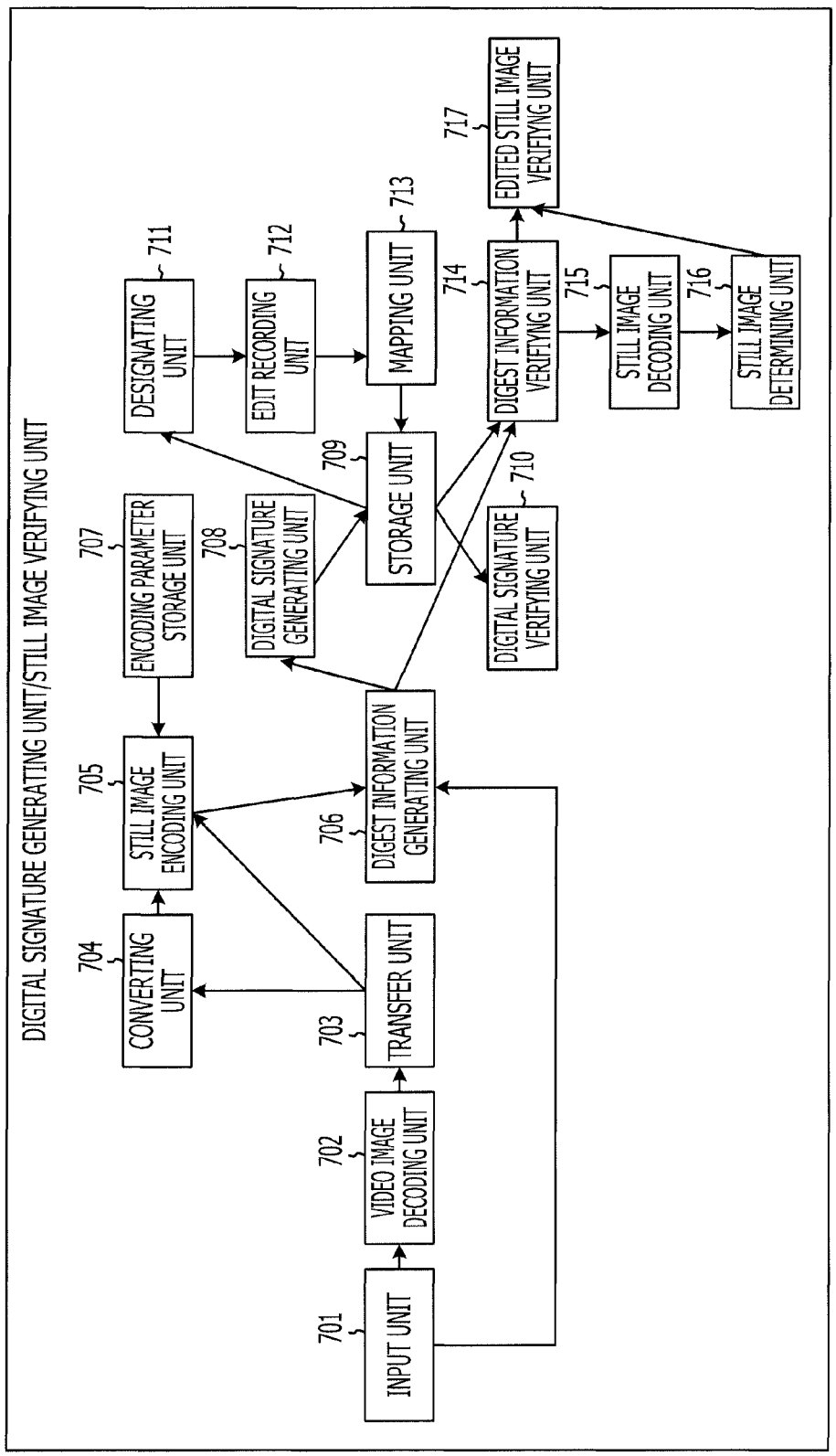
FIG. 7 is a block diagram of a digital signature generating unit and a still image verifying unit.

FIG. 7 is a functional block diagram of the digital signature generating (generator) unit 303 of FIG. 3 and the still image verifying unit 504 of FIG. 5. The digital signature generator unit 303 and the still image verifying unit 504 are substantially identical in functional configuration to each other and the two elements are described together below. The digital signature generator unit 303 includes storage unit 709, designating (designator) unit 711, edit recording unit 712, and mapping unit 713. In addition to the structure of the digital signature generator unit 303, the still image verifying unit 504 includes, instead of a digital signature generating (generator) unit 708, digital signature verifying unit 710, digest information verifying unit 714, still image decoding unit 715, still image determining unit 716, and edited still image verifying unit 717. Each of the digital signature generator unit 303 and the still image verifying unit 504 may further include input unit 701, video decoding unit 702, transfer unit 703, converting (converter) unit 704, still image encoding unit 705, digest information generating (generator) unit 706, encoding parameter storage unit 707, and digital signature generating (generator) unit 708.

The control function of these elements is performed by the CPU 601 which executes a program stored on one of the ROM 602, the RAM 603, the magnetic disk 605, and the optical disk 607 illustrated in FIG. 6. The control function may be executed by another CPU via the interface 609. The control function corresponds to the input unit 701 through the edited still image verifying unit 717.

The input unit 701 has a function of inputting information. More specifically, the input unit 701 in the digital signature generator unit 303 inputs original video image information. The input unit 701 in the still image verifying unit 504 receives extracted still image information from the verifying terminal 108. The input information is stored on a storage area of one of the RAM 603, the magnetic disk 605, and the optical disk 607.

The video decoding unit 702 analyzes and acquires video data on a per frame basis. The frames include a predictive frame that is independently unreplayable (i.e. it can not be replayed independently) and a video image frame that is independently replayable (i.e. it can be replayed independently). More specifically, according to an MPEG format, the video data is analyzed by an MPEG decoder, and then acquired on a per frame basis. In the MPEG, the predictive frames include a P picture and a B picture, and the independently replayable video image frames include an I picture. The video data complies with the video image format of MPEG-1, MPEG-2, or H.264/AVC standards. A decoded frame is stored on a storage area of one of the RAM 603, the magnetic disk 605, and the optical disk 607. While replaying a frame is described herein as an example, the present invention is not limited to any particular process and may pertain to any process executed in connection with the video data including reproducing, broadcasting, duplicate, access, etc.

If the predictive frame is input, the transfer unit 703 transfers the frame to the converter unit 704. If the video image frame is input, the transfer unit 703 transfers one of first and second video image frames to the still image encoding unit 705. The video image frames include the first video image frame present in the video data from the beginning, and the second video image frame, which is replayable and into which the converter unit 704 has converted a predictive frame. More specifically, according to the MPEG format, the independently replayable video image frame, into which the converter unit 704 has converted the P picture and the B picture as predictive frames, and the I picture are transferred to the still image encoding unit 705. The transferred data is stored on a storage area of one of the RAM 603, the magnetic disk 605, and the optical disk 607.

The converter unit 704 converts the independently unreplayable predictive frame into the second video image frame as an independently replayable frame in accordance with the first video image frame as the independently replayable frame. More specifically, the converter unit 704 converts the P picture and the B picture as the predictive frames into the replayable video image frame in accordance with the independently replayable I picture. The converter unit 704 converts the P picture in accordance with the forward I picture or P picture. The converter unit 704 converts the B picture in accordance with the forward or backward I picture or P picture. The converted frame may be stored on a storage area of one of the RAM 603, the magnetic disk 605, and the optical disk 607.

The still image encoding unit 705 encodes one of the first and second video image frames into the video data in accordance with the image format. More specifically, the video image frame into which the P picture and the B picture are converted, and the frame as the I picture are encoded into a still image in accordance with the image format. The image formats include, besides JPEG format, JPEG 2000 format, portable network graphic (PNG) format, and graphics interchange format (GIF). The encoded still image may be stored on a storage area of one of the RAM 603, the magnetic disk 605, and the optical disk 607.

The digest information generator unit 706 generates the summary information on a per data unit basis of the image data encoded by the still image encoding unit 705. The digest information generator unit 706 may also generate the summary information of edit source image data for verification purposes. The edit source image data is mapped to edited image data as a verification target by the mapping unit 713 for verification.

More specifically, the digest information is generated in accordance with the still image encoded with the JPEG format. The above-described operation is repeated by the number of frames held in the video data. The generated digest information may be stored on a storage area of one of the RAM 603, the magnetic disk 605, and the optical disk 607.

The encoding parameter storage unit 707 stores at least a parameter of the still image to be encoded by the still image encoding unit 705. The parameter may be information needed to encode the still image into the JPEG format. For example, the parameter is a compression rate and a quality level directly affecting image quality, and color depth and brightness affecting the color and brightness of an image. The encoding parameter storage unit 707 stores these values as the parameters, and uses the parameters in the encoding of the still image. The stored parameter may also be stored on a storage area of one of the RAM 603, the magnetic disk 605, and the optical disk 607.

The digital signature generator unit 708 generates a digital signature with the digest information generated by the digest information generator unit 706 as a signing target. The signing target may include a parameter stored by the encoding parameter storage unit 707 besides the digest information. More specifically, a set of digest information having n frames is encrypted with a private key in order to generate the digital signature. The generated digital signature is stored on in the storage generating apparatus 103, the magnetic disk 605, and the optical disk 607.

The storage unit 709 stores the digital signature generated by the digital signature generator unit 708 and the signing target. The storage unit 709 may also store the original video image information input by the input unit 701. The area storing the digital signature and the signing target may be one of the video image management DB 301 and the video image management DB 501. The video image management DB 301 and the video management DB image 501 may be present in one of the RAM 603, the magnetic disk 605, and the optical disk 607. The digital signature and the signing target may be stored on a storage area other than that of the digital signature generating apparatus 103 and the still image verifying apparatus 107.

The digital signature verifying unit 710 verifies the authenticity of the digital signature. If decrypting results resulting from decrypting the digital signature with a public key match the summary information of the signing target of the digital signature, the digital signature verifying unit 710 outputs results guaranteeing the authenticity of the digital signature. The verification results are stored on a storage area of one of the RAM 603, the magnetic disk 605, and the optical disk 607.

The designator unit 711 designates edit source image data from the video image data including an image data group having the summary information. The video image data may be an image data group not inter-frame compressed, or an image data group into which the still image encoding unit 705 has encoded the inter-frame compressed video image data. The digest information as the summary information may be generated by the digest information generator unit 706 on each image data, or may be input together with the video image data by the input unit 701.

For example, the designator unit 711 may designate a 5550th image from the original video image information as the original video image data stored by the storage unit 709. The information of the designated image is stored on a storage area of one of the RAM 603, the magnetic disk 605, and the optical disk 607.

The edit recording unit 712 records edit information of the edit source image data corresponding to the image designated by the designator unit 711. The edit information indicates what edit has been performed on the image. More specifically, if the 5550th image is selected by the designator unit 711 and is then edited, the edit recording unit 712 records the edit information.

The edit information may include a software program performing an edit process, the edit process performed by the software program, and a set value incidental to the edit process. The edit information may include the software program performing the edit process, and an event of which the software program is notified. The notified event is data describing an edit operation that an extractor performs using the mouse or the keyboard. The recorded content is stored on a storage area of one of the RAM 603, the magnetic disk 605, and the optical disk 607.

The mapping unit 713 maps the edited image data, the edit source image data, position information of the edit source image data on the video image data, and the edit information recorded by the edit recording unit 712.

More specifically, if the 5550th image is selected by the designator unit 711 and then edited, the mapping unit 713 maps the edited image data, the image data of the 5550th image serving as an edit source image, the designation of the 5550th image of the original video image information, and the edit information used to generate an edited image from the edit source image. The mapped information is stored on a storage area of one of the RAM 603, the magnetic disk 605, and the optical disk 607.

Using the summary information generated by the digest information generator unit 706, the digest information verifying unit 714 verifies the authenticity of the image data as a verification target. The digest information verifying unit 714 may verify the image data by confirming that the summary information of the edit source image data for verification matches the summary information of the image data generated from among the video image data in accordance with the position information mapped by the mapping unit 713.

More specifically, the digest information verifying unit 714 determines that the authenticity of the edit source image data for verification has been verified if the digest information of the edit source image data for verification generated by the digest information generator unit 706 matches the digest information generated beforehand by the digest information generator unit 706 and then stored on the storage area of one of the RAM 603, the magnetic disk 605, and the optical disk 607. The digest information verifying unit 714 also acquires 5550th digest information from the digest information of the original video image information in accordance with the position information indicating 5550th. Subsequent to the acquisition, the digest information verifying unit 714 determines that the authenticity of the image data as the verification target has been verified if the 5550th digest information matches the digest information of the image data as the verification target. The verification results are stored on a storage area of one of the RAM 603, the magnetic disk 605, and the optical disk 607.

The still image decoding unit 715 restores the edited image data in accordance with the edit source image data and the edit information of the edit source image data recorded by the edit recording unit 712. The still image decoding unit 715 may restore the edited image data in accordance with the edit source image data for a verification process and the edit information mapped to the edited image data as the verification target.

More specifically, the still image decoding unit 715 generates a command intended for a software program, based on the extracted still image information serving as the edit source image data for the verification process, and the edit information. If the decoding unit 503 executes the generated command, the software program generates the edited image data. Alternatively, the still image decoding unit 715 generates an event intended for the software program. If the decoding unit 503 transmits the generated event to the software program, the software program generates the edited image data. The decoded edited image data is stored on a storage area of one of the RAM 603, the magnetic disk 605, and the optical disk 607.

The still image determining unit 716 determines whether the edited image data for the verification process decoded by the still image decoding unit 715 matches the edited image data as the verification target. More specifically, the still image determining unit 716 may determine whether the digest information of the decoded edited image data for the verification process matches the digest information of the edited image data as the verification target.

Even if the decoded edited image data for the verification process looks like in visual image the edited image data as the verification target, there may be a slight difference in data. For example, the software program described in the edit information may not be present in the still image verifying apparatus 107, and a substitute software program restoring the image may be present in the still image verifying apparatus 107. In such a case, the decoding unit 503 may generate the edited image data for the verification process in accordance with the substitute software program. Since the software program used to generate the edited image data is different, the resulting data may be slightly different.

The images are determined to be identical to each other even if the two pieces of data are slightly different. The still image determining unit 716 thus compares the two images on a per pixel basis. If a difference between pieces of color information of the pixels of all the images remains equal to or smaller than a constant value, the two images may be determined as identical. In another embodiment, the still image determining unit 716 determines that the two images are identical if the sum of differences between the pieces of color information of all the pixels remains equal to or smaller than a constant value. In yet another embodiment, before determining whether the images are identical, the still image determining unit 716 may convert the color information into any color space such as a red-green-blue (RGB) color space or a hue-saturation-lightness (HSL) color space. The determination results may be stored on a storage area of one of the RAM 603, the magnetic disk 605, and the optical disk 607.

The edited still image verifying unit 717 verifies the authenticity of the edited image data as the verification target in accordance with the verification results of the digest information verifying unit 714 and the determination results of still image determining unit 716. For example, the edited still image verifying unit 717 verifies the authenticity of the edited image data if the digest information verifying unit 714 has successfully verified the digest information and if the still image determining unit 716 has determined that the decoded edited image data for the verification process matches the edited image data as the verification target. The verification results are stored on a storage area of one of the RAM 603, the magnetic disk 605, and the optical disk 607.

The digital signature verifying unit 404 in the video extracting apparatus 105 may have part of the function of the still image verifying unit 504.

Figure 8:
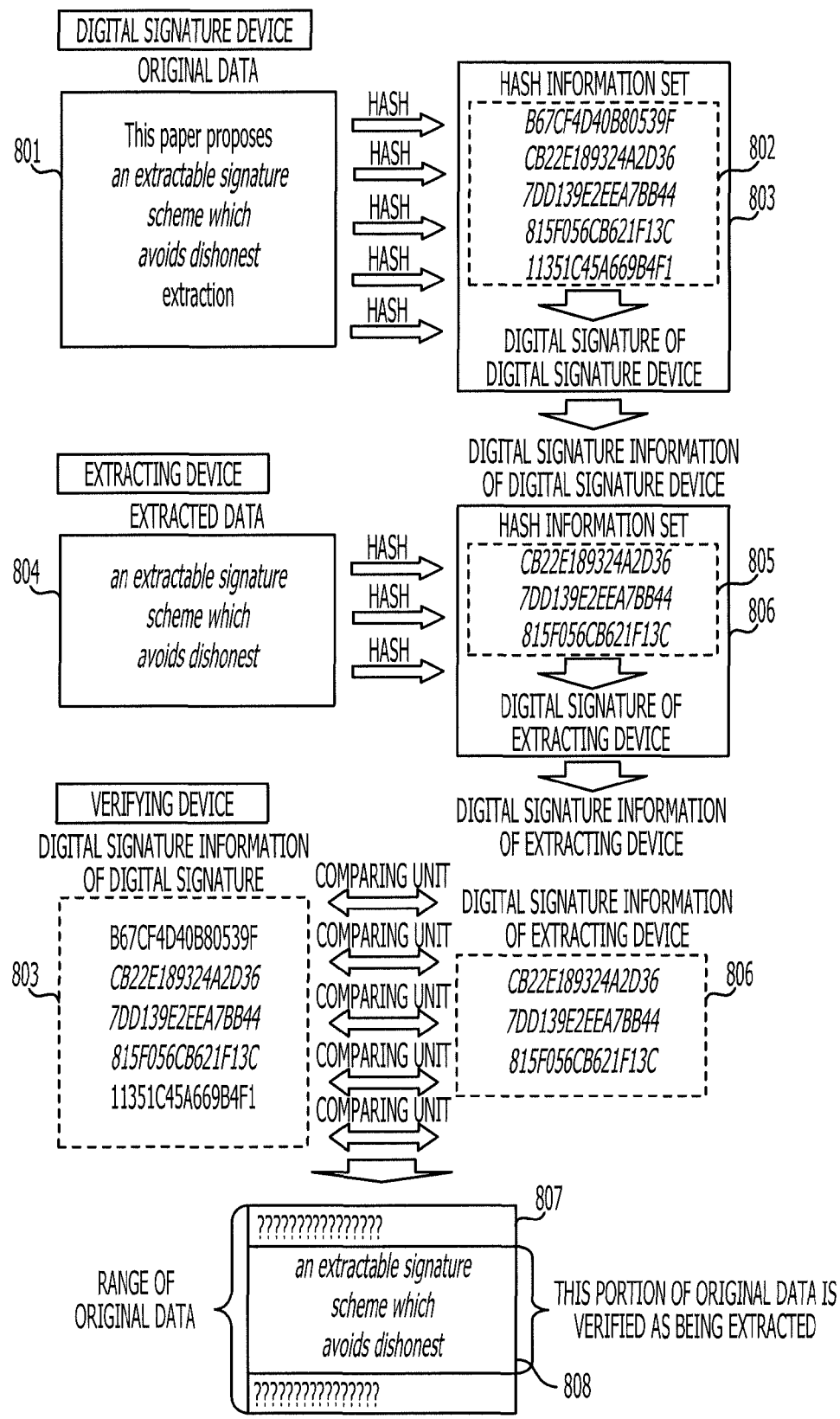
FIG. 8 is a diagram illustrating an outline of a digital signature algorithm.

FIG. 8 illustrates a summary of a signature algorithm. A digital signature device partitions original data 801 into data segments, calculates a hash set of each data segment, and then generates a hash information set 802. The generated hash information set 802 becomes a signing target of the digital signature. The digital signature device digitally signs the signing target. The hash information set 802 and the digital signature are combined into digital signature information 803.

An extractor device extracts a data segment from the data digitally signed by the digital signature device, thereby resulting in extracted data 804. The extractor device performs the same process as that of the digital signature device, thereby digitally signing a hash information set 805. The extractor device thus sets the hash information set 805 and the digital signature together as digital signature information 806 of the extractor device.

The verifier device verifies the authenticity of the hash information set 802 in accordance with the digital signature of the digital signature device in the digital signature information 803 of the digital signature device. Similarly, the verifier device verifies the authenticity of the hash information set 805 in accordance with the digital signature of the extractor device in the digital signature information 806 of the extractor device. The verifier device generates hash information set from the disclosed data segment and verifies that the hash information set matches the hash information set 805. Finally, the verifier device compares the hash information set of the digital signature device with the hash information set of the extractor device, and shows that a range 808 of the hash information of the extractor device is an extracted of a range 807 of the original data. If the hash information of the original data 801 is not included in the hash information of the extracted data 804, the data segment proves to be altered.

Figure 9:
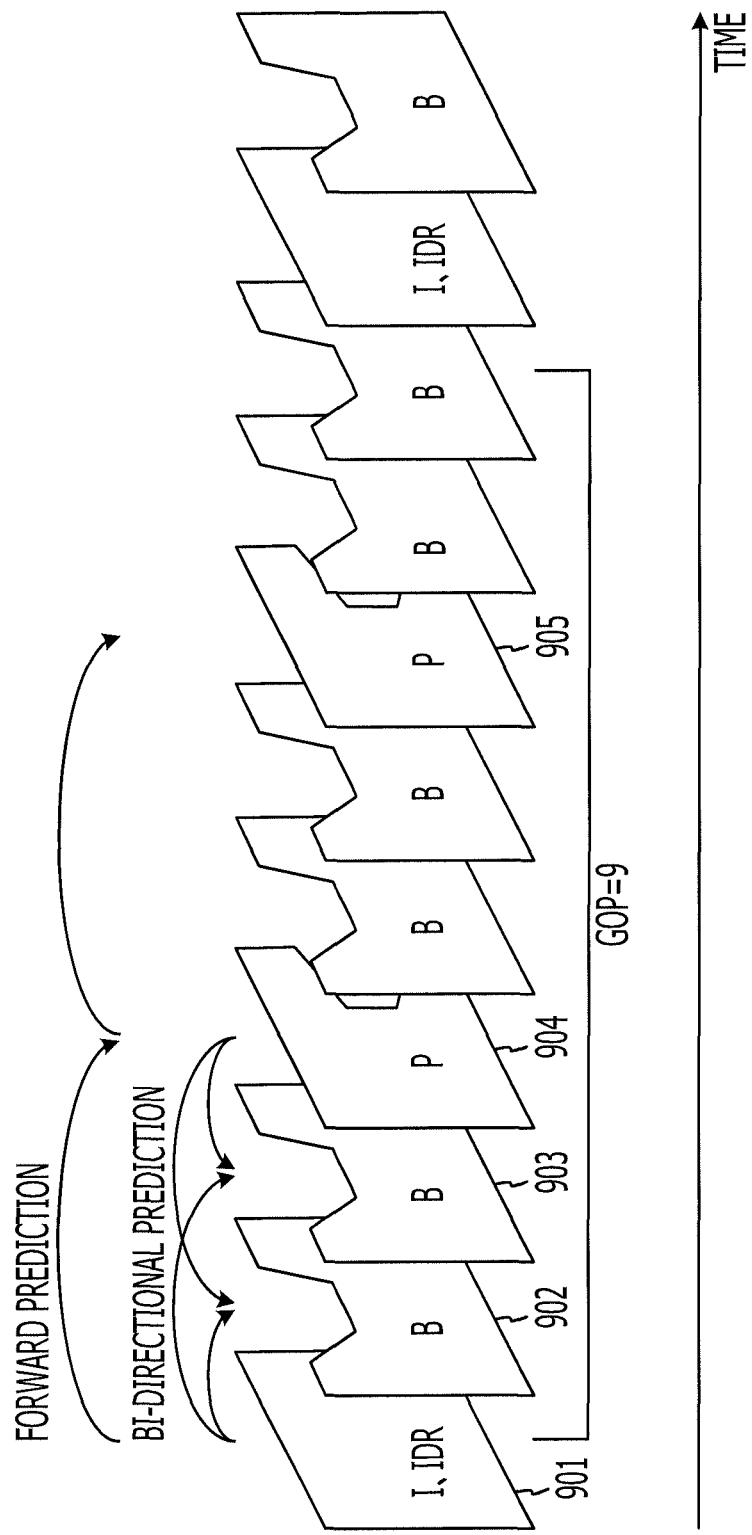
FIG. 9 is a diagram illustrating an example of types of images of compressed video image data and an arrangement of the images.

FIG. 9 illustrates image types of compressed video data and an arrangement of images. The frames forming the compressed video data mainly include an independently replayable video image frame and a predictive frame including difference data from the video image frames. The predictive frame alone is difficult to reproduce.

According the MPEG standards, an independently replayable video image frame is referred to as I picture, and predictive frames are referred to as a P picture or a B picture. The I picture includes, in a compressed form, all image data needed for displaying the I picture. The I pictures also include an instantaneous decoder refresh (IDR) picture newly added in accordance with H.264/AVC standard. In the discussion that follows, the I picture and the IDR picture are simply referred to as an I picture. The features of each picture are described below. As illustrated in FIG. 9, the I picture is a frame 901. The P pictures are frames 904, and frame 905, and the B pictures are frame 902, and frame 903.

The P picture and the B picture are also referred to as inter-frame predictive pictures. With an I picture or P picture decoded in close range serving as a reference image, the P picture includes a difference from the I picture or P picture as predictive error information. For example, the frame 904 is converted into an independently replayable frame by referencing the image of the frame 901 as an I picture. The frame 905 is converted into an independently replayable frame by the video decoding unit 702 by referencing the image of the frame 904 as the P picture.

In this way, the converter unit 704 performs a forward prediction operation to reference a past frame to convert the P picture. The reference frame is an immediately preceding I picture or P picture. According to the H.264/AVC standard, an even more prior reference frame may be used.

With a past or future I picture or a P picture decoded in close range serving a reference image, a B picture includes a difference from the decoded I picture or P picture as predictive error information. For example, the converter unit 704 converts the frame 902 into an independently replayable frame by referencing the image of the frame 901 as an I picture and the image of the frame 904 as a P picture. The frame 903 is also converted in a similar fashion.

The converter unit 704 performs a bidirectional prediction process referencing a past frame and a future frame in order to convert the B picture. As in the P picture, the reference frame of the B picture is an immediately preceding I picture or P picture. According to the H.264/AVC standard, an even more prior reference frame may be used.

In the P picture and the B picture, the use of a difference to a prior image or a subsequent image eliminates a redundancy of data in time axis, and achieves a high data compression rate. As illustrated in FIG. 9, several images are grouped into a minimum unit referred to as a group of pictures (GOP). GOP is GOP=9 in FIG. 9. The GOP is independently replayable, and offers a structure that permits a video image to be reproduced or edited in the course of the video image.

The function of the IDR picture is described below. According to the H.264/AVC standard, the P picture and the I picture refer to pictures beyond an I picture and a P picture immediately prior thereto, and reproduction is not necessarily performed starting with the designated I picture. This problem is overcome by the IDR picture. Upon receiving the IDR picture, the video decoding unit 702 clears a buffer storing a reference frame. The video decoding unit 702 thus guarantees that an image is reproduced from the IDR picture. Since the reference frame is cleared, the P picture and the B picture are unable to refer to frames beyond the IDR picture.

Figure 10:
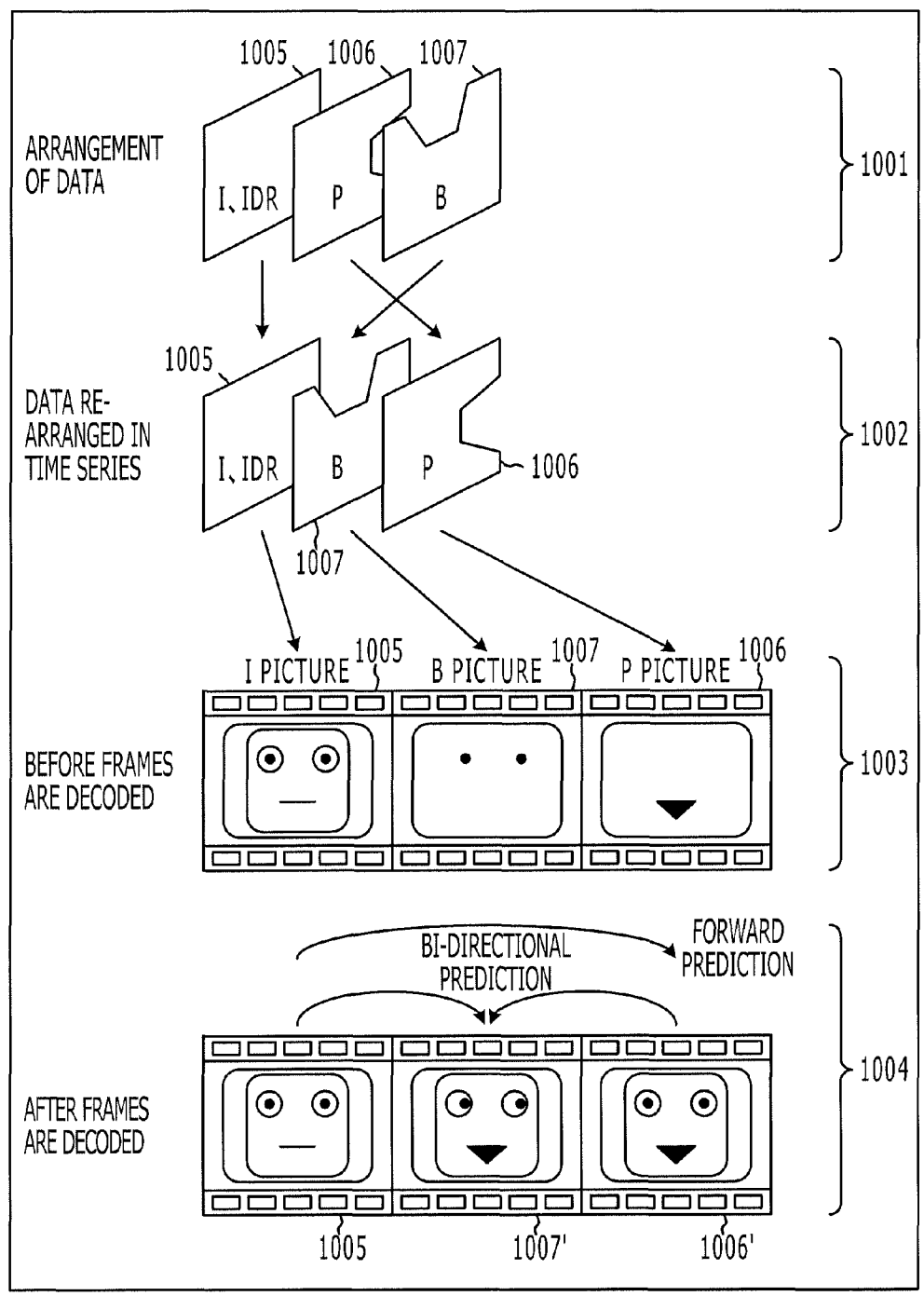
FIG. 10 is a diagram illustrating an example in which P and B pictures of compressed video image data are converted into independent images.

FIG. 10 illustrates a process in which the P and B pictures of the compressed video data are converted into an independent image. The compressed video data is arranged in the order of reference source frames as denoted in state 1001. The video decoding unit 702 analyzes the compressed video data in the frame order of frame 1005, frame 1006, and frame 1007. According to the MPEG format as a specific analysis example, the data is entropy encoded using discrete cosine transform (DCT). The data is thus decoded using inverse DCT, and then analyzed on a per frame basis.

As illustrated in FIG. 10, frame 1005 is an I picture, frame 1006 is a P picture, and frame 1007 is a B picture. The video decoding unit 702 rearranges the frames in the time-series order as denoted in state 1002, i.e., frame 1005, frame 1007, and frame 1006.

The conversion process of converting the P and B pictures into independent images is described below. Illustrated in state 1003 prior to the restoration of the video image frame are a specific image included in frame 1005, and predictive error information included in frames 1007 and 1006. Frame 1005 as the I picture includes all the image data. Frame 1006 and frame 1007 as the P picture and the B picture, respectively, include predictive error information. In state 1004 subsequent to the restoration of the video image frame, the video decoding unit 702 has respectively converted frame 1006 and frame 1007 into replayable frames 1006' and 1007'.

More specifically, based on frame 1005, the converter unit 704 generates the video image frame 1006' which has overwritten frame 1006 serving as a difference. Similarly, based on from 1005 and frame 1006, the converter unit 704 generates the video image frame 1007' which has overwritten frame 1007 serving as a difference.

In addition to the predictive error information, the P picture and the B picture include movement compensation information which indicates how far the image has shifted within a specific range from each of the I picture and the P picture serving as a reference. For convenience of explanation, the video image frame is decoded after the frames are arranged in the time-series order in FIG. 10. Alternatively, the frames may be arranged in the time-series order after the video image frame is decoded.

Figure 11:
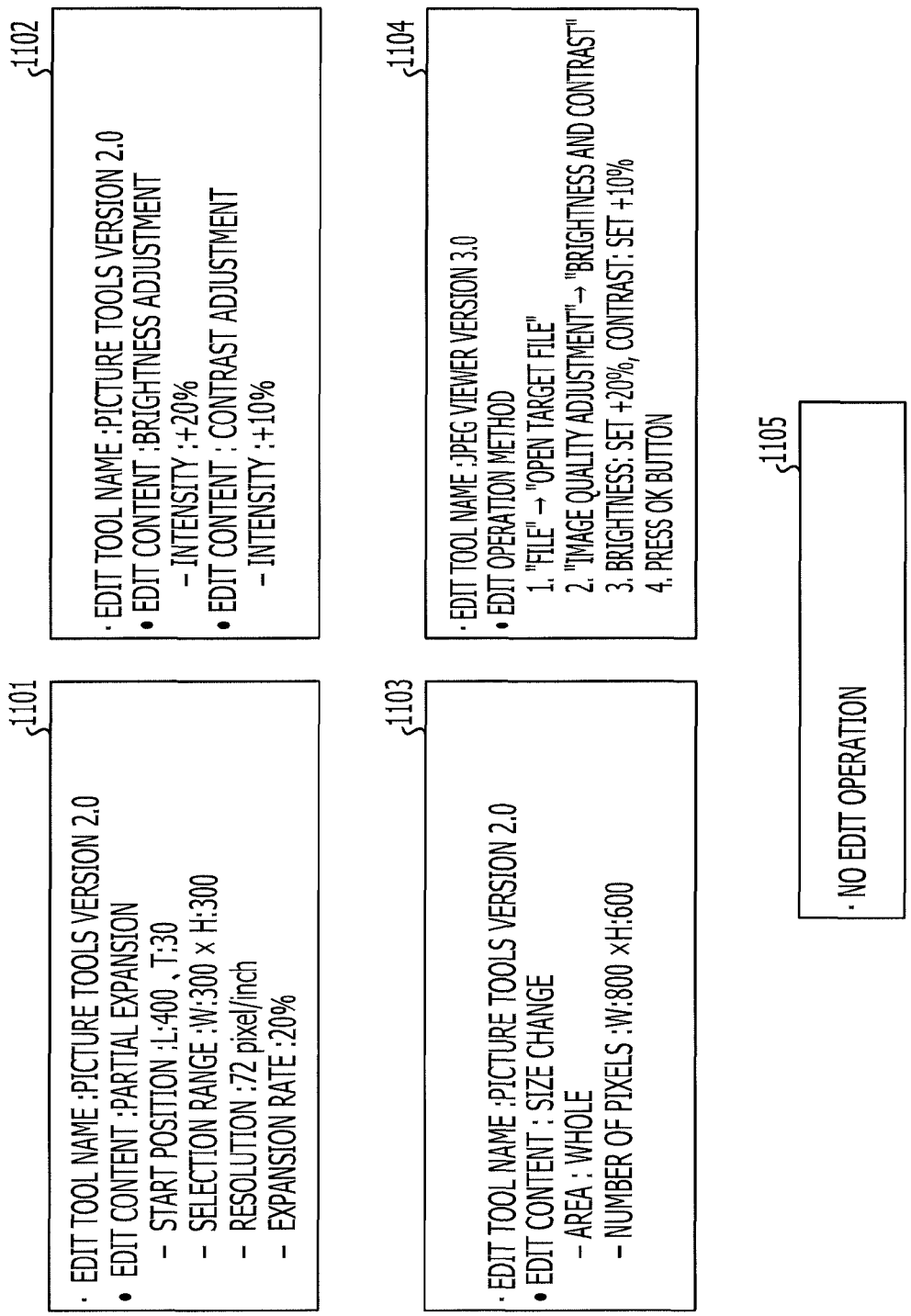
FIG. 11 illustrates an example of record of edit information of extracting still image information.

FIG. 11 illustrates a recording process of the edit information about the extracted still image information. In FIG. 11, indicators of edit information 1101-edit information 1105 (edit information 1101. 1102, 1103, 1104 and 1105) are illustrated. The edit information 1101 is parameter information with which a partial expansion operation is performed. The edit information 1101 lists edit content as "partial expansion," followed by parameters for partial expansion. More specifically, a start position of the partial expansion is L (left): 400 [pixels], T (top): 30 [pixels], and a selection range of the partial expansion is W (width): 300 [pixels]×H (height): 300 [pixels]. A resolution of the partial expansion is 72 [pixels/inch], and an expansion rate of the partial expansion is 20[%].

The edit information 1102 is parameter information for brightness and contract adjustment. The edit information 1102 includes two edit contents with a first content for "brightness adjustment," and a second content for "contrast adjustment." A parameter for the brightness adjustment is an intensity of +20[%]. A parameter for the contrast adjustment is an intensity of +10[%].

The edit information 1103 is parameter information for size change of an entire image. The edit information 1103 lists a edit content as "size change," followed by parameters for the size change. The size change is effective over the entire area, and a pixel count subsequent to the size change is W: 800 [pixels]×H: 600 [pixels].

The edit information 1104 is parameter information for a count of performed edit operations. The content of the edit information 1104 includes a record of an edit operation performed on an edit tool as a graphic user interface (GUI) by the mouse and the keyboard of the extractor's terminal 106. More specifically, using the mouse or the like on the extractor's terminal 106, an extractor may select a "file" from a menu bar, and select "open target file" from a list of submenus in a first edit operation. The extractor may select "image quality adjustment" from the menu bar, and select "brightness and contrast" from a list of submenus in a second edit operation. In response to a dialog displayed subsequent to the selection, the extractor may set +20[%] to a brightness input box, +10 [%] to a contrast input box, and press "OK" on the extractor's terminal 106.

The edit information 1105 is parameter information with no edit operation performed. The extractor's terminal 106 may output parameter information like the edit information 1105 in order to clarify that no edit operation has been performed.

Figure 12:
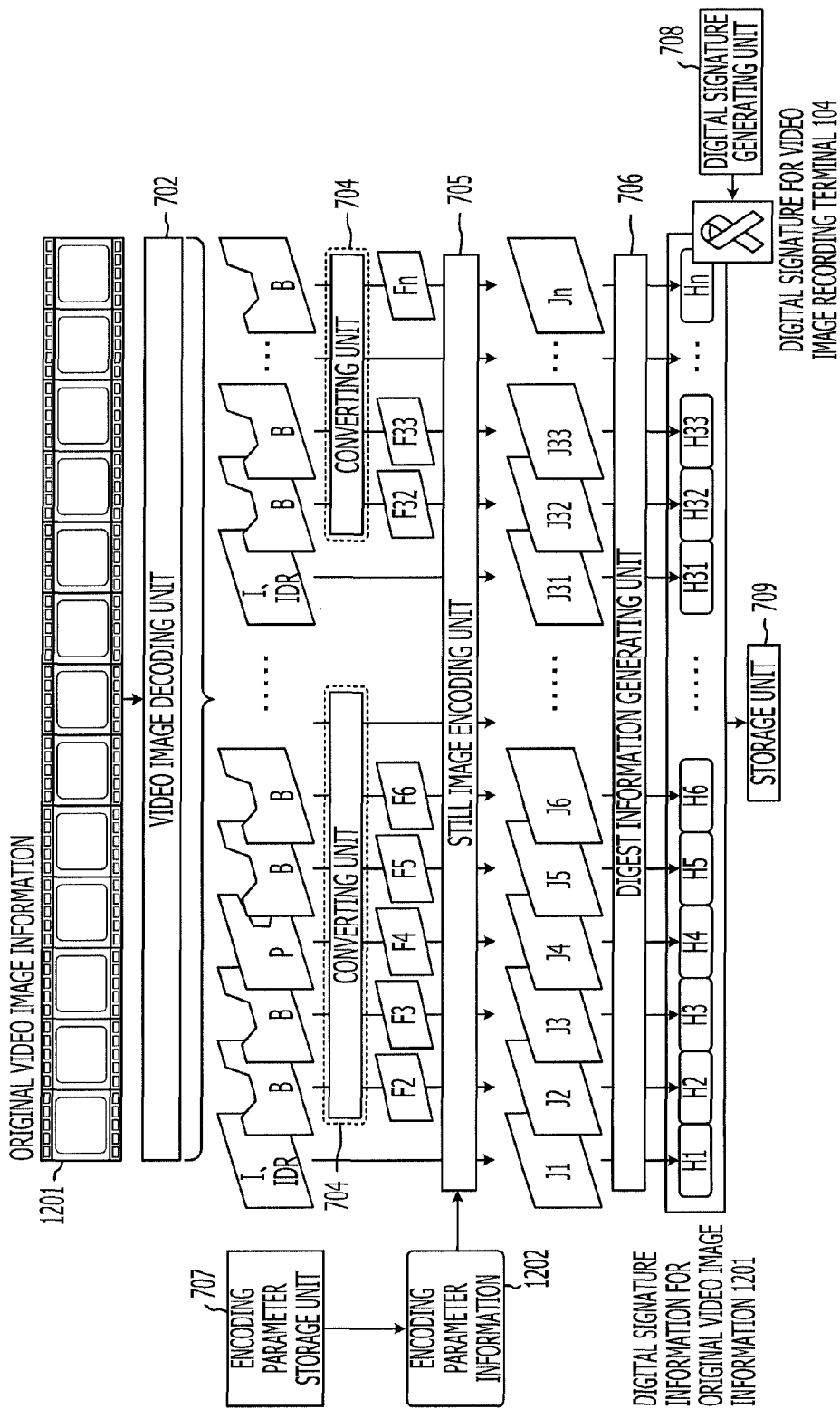
FIG. 12 illustrates a summary of a digital signature generating process of original video image information.

FIG. 12 diagrammatically illustrates a digital signature generating process of original video image information 1201. The video decoding unit 702 analyzes the original video image information 1201 input to the digital signature generator unit 303 on a per frame basis, and then rearranges the original video image information 1201. The original video image information 1201 is also stored on the storage unit 709. The transfer unit 703 transfers each frame to the converter unit 704 if the frame is one of a P picture and a B picture, and to the still image encoding unit 705 if the frame is one of an I picture and an IDR picture.

The frame transferred to the converter unit 704 is converted into an independently replayable video image frame by the converter unit 704. More specifically, the converter unit 704 outputs video image frame F2, video image frame F3, . . . , video image frame Fn. The conversion method has been discussed with reference to FIG. 10. The independently replayable video image frame may have the same data format such as of the I picture or the IDR picture or a non-compressed image format.

The still image encoding unit 705 in the digital signature generating apparatus 103 encodes the video image frames transferred as one of the I picture and the IDR picture transferred from the transfer unit 703, and the video image frame converted by the converter unit 704, thereby generating still images. More specifically, the still images are still image J1, still image J2, still image J3, . . . , still image Jn. During the encoding process, the still image encoding unit 705 may acquire encoding parameter information 1202 from the encoding parameter storage unit 707 and encode the video image frames in accordance with the value of each parameter.

The parameter is acquired because of the following reason. If any single still image is extracted from the original video image information, it is necessary to guarantee that the extracted still image is part of the original video image information and is free from any alteration. When the original video image information is encoded in accordance with an image format, the same encoding method is to be used.

More specifically, when the video image frame is encoded in accordance with the JPEG format as one of the image formats, the generating method may be different depending an encoding software tool encoding the video image frame. If the generating method is different, the resulting image may be different information as digital data even if the image looks visually the same. Such an inconvenience is avoided if the same encoding method is used in the digital signature generating and the digital signature verification.

As described with reference to the encoding parameter storage unit 707 of FIG. 7, the information needed to encode the image in accordance with the JPEG format includes the compression rate and quality level directly affecting image quality, and color depth and brightness affecting the color and brightness of an image. These pieces of information may be determined beforehand, and pre-stored on the digital signature generating apparatus 103, and then acquired as necessary. A setting of a progressive type and a non-progressive type may be stored as a parameter in addition to the above-described parameters. Parameters of a floating-point operation, a high-precision integer operation, and a high-speed integer operation may be set in the DCT operation in the JPEG format.

Each parameter may be stored on each piece of the original video image information. The original video image information may be a record of checking a bridge, for example. A photographing position may be at a location which is not exposed to sufficient light, and luminance may be in a state close to 0%. If the still image encoding unit 705 encodes the image with luminance set to be close to 100%, a still image subsequent to the encoding process is easy to view. In this way, a particular parameter is used in the original video image information under a particular condition, while normal parameters are set in the other original video image information. The parameters thus set are stored on a per file basis.

The JPEG format has been discussed in the above example. Another still image format may be used as described with reference to the still image encoding unit 705 of FIG. 7. Parameters may be stored for each format, and the still image encoding unit 705 may encode the image in accordance with the parameters.

In the digital signature generating apparatus 103, the digest information generator unit 706 generates the digest information on each still image encoded by the still image encoding unit 705. More specifically, the digital signature generating apparatus 103 generates digest information H1, digest information H2, . . . , digest information Hn. The digital signature generator unit 708 generates a digital signature for a set of the generated digest information. The digital signature information includes the digest information and the digital signature. The generated digital signature is stored on the storage unit 709.

To assure originality authentication in a reliable fashion, the digital signature generating apparatus 103 may handle, as a signing target, the digest information and the conversion parameter information used by the still image encoding unit 705, and then generate the digital signature on the signing target.

A one-way hash function may be used to generate the digest information, and Rivest Shamir Adleman (RSA) as one of the public key encryption methods may be used to generate the digital signature. The one-way hash functions may include algorithms such as MD5, SHA-1, and SHA-256. In the SHA-256 algorithm, the digest information of 256 bits (23 bytes) is generated per message.

More specifically, if video data of 30 frames per second (fps) of about 1 hour is recorded, 108,000 frames (30 fps×60 seconds×60 minutes) are stored. In the SHA-256 algorithm, 108,000 frames×32 bytes=about 3.5 Mbytes. Together with information signed in accordance with RSA, the digital signature information of about 4 Mbytes results. Originality authentication is assured with a small amount of stored information in comparison with the video image information.

The digital signature generating process of the original video image information is performed as described above. The process of FIG. 12 is described below with reference to FIGS. 22 and 23.

Figure 13:
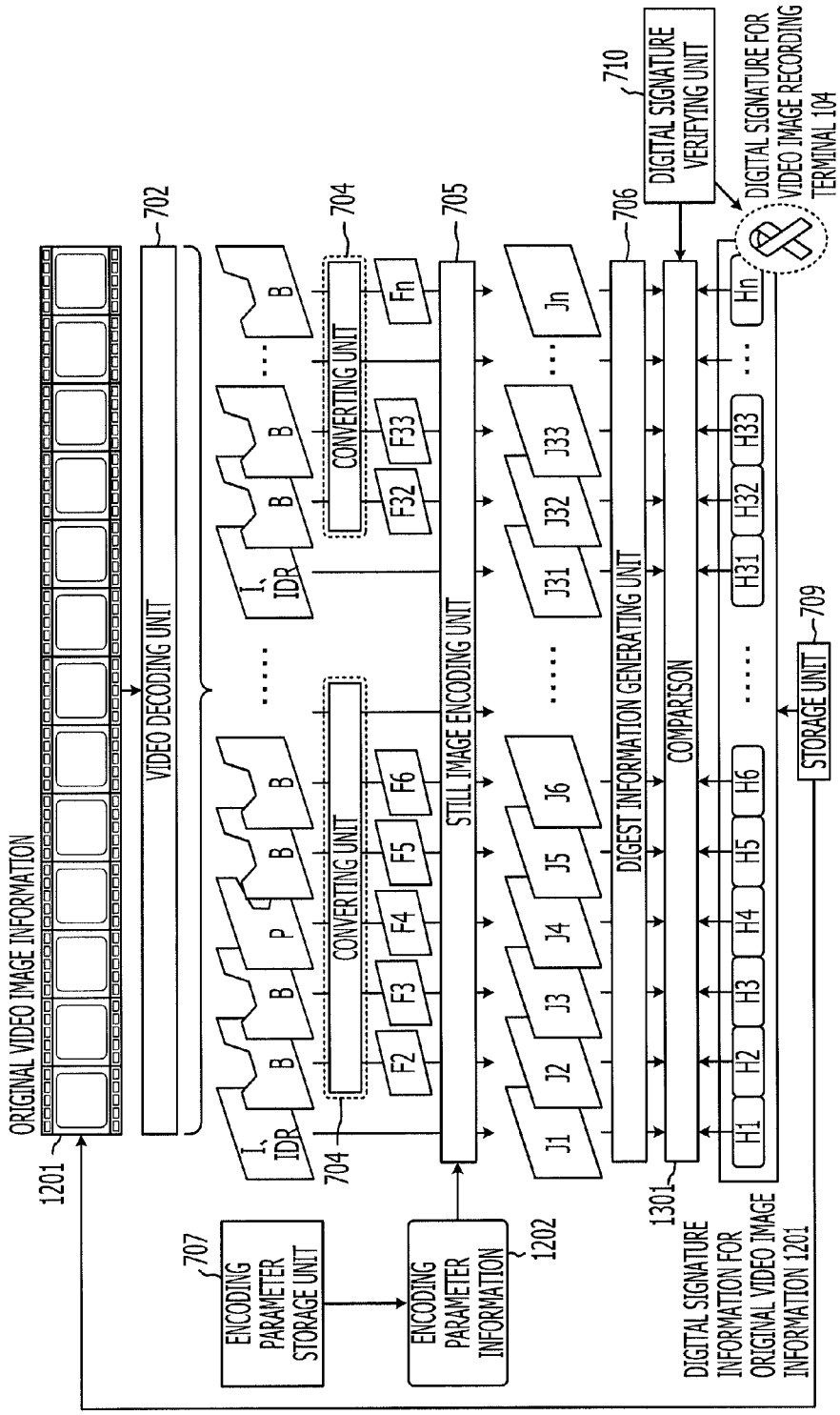
FIG. 13 illustrates a summary of a digital signature verification process of original video image information.

FIG. 13 diagrammatically illustrates the digital signature verification process of the original video image information. The still image verifying apparatus 107 acquires the original video image information 1201 and the digital signature information of the original video image information 1201 stored on the storage unit 709. Using the digital signature information of the original video image information 1201, the digital signature verifying unit 710 verifies that the acquired original video image information 1201 has not been altered.

The generating process of generating the digest information from the original video image information is identical to the digital signature generating process. More specifically, the video decoding unit 702 analyzes the original video image information 1201 on a per frame basis, and rearranges the original video image information 1201 in the time-series order. The transfer unit 703 transfers each frame to the converter unit 704 if the frame is one of a P picture and a B picture, and to the still image encoding unit 705 if the frame is one of an I picture and an IDR picture.

The frame transferred to the converter unit 704 is converted into an independently replayable video image frame by the converter unit 704. The still image verifying apparatus 107 generates the video image frames transferred as the I and IDR pictures by the transfer unit 703 and the video image frame converted by the converter unit 704. More specifically, video image frame F2, video image frame F3, video image frame Fn are output. The still image encoding unit 705 in the digital signature generating apparatus 103 encodes the video image frames, thereby generating still images. More specifically, the still images are still image J1, still image J2, still image J3, . . . , still image Jn. The still image encoding unit 705 may acquire encoding parameter information 1202 and encode the video image frames.

The digest information generator unit 706 in the still image verifying apparatus 107 generates the digest information on a per encoded still image. Finally, the digital signature verifying unit 710 in the still image verifying apparatus 107 performs a comparison operation 1301 on the generated digest information and the digest information acquired from the storage unit 709 on a piece by piece basis. If all pieces of digest information match each other, the original video image information proves to be free from alteration. The digital signature verification process of the original video image information is thus performed. The specific process of FIG. 13 is specifically described with reference to FIG. 26.

Figure 14:
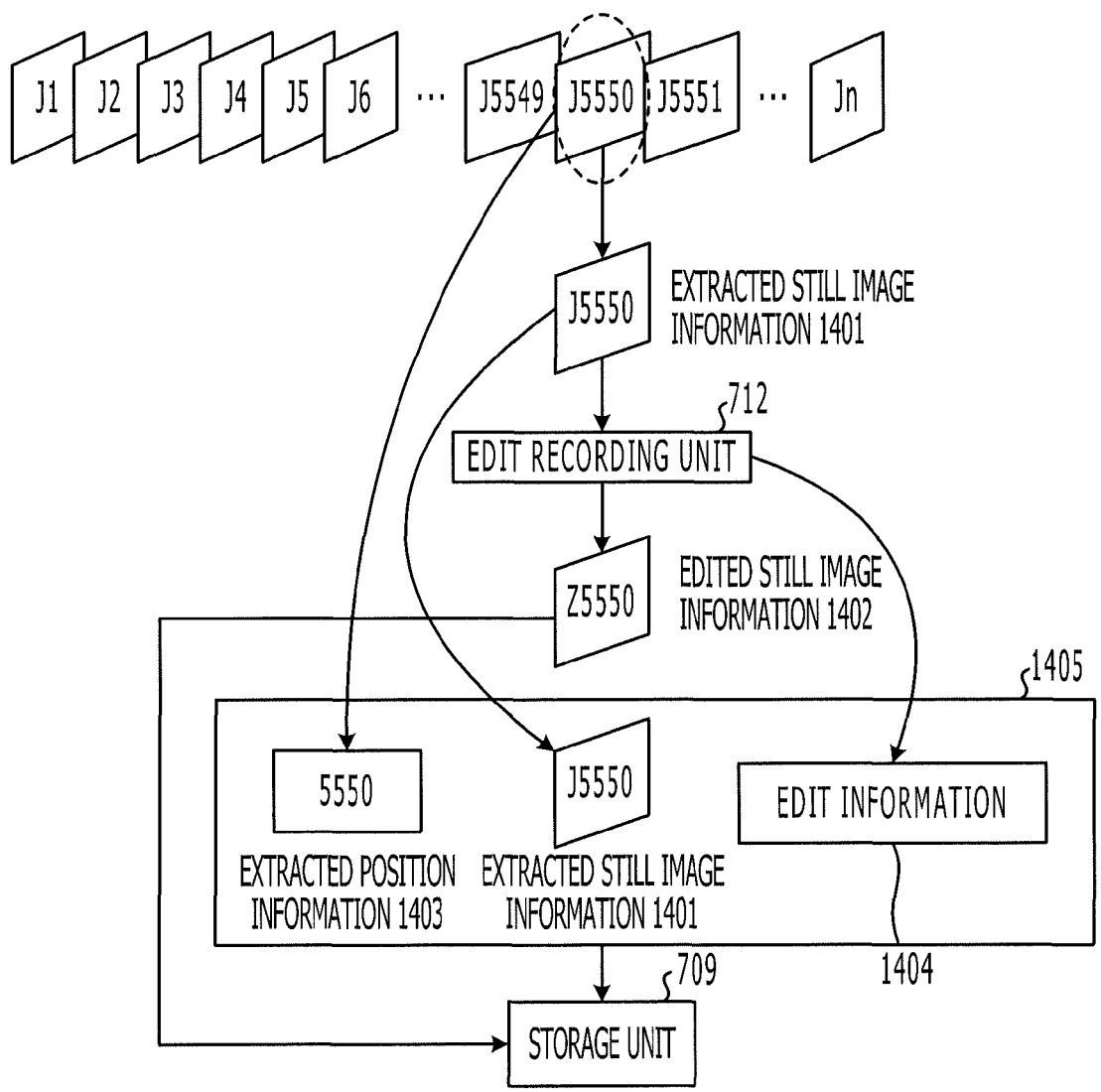
FIG. 14 diagrammatically illustrates a generating process of extracting still image information and edited extracting still image information.

FIG. 14 diagrammatically illustrates the generating method of the extracted still image information and the edited extracted still image information. In the process of FIG. 14, the extractor's terminal 106 extracts picture J5550 as the 5550th picture from the head, and performs the partial expansion. The 5550th picture becomes extracted still image information 1401. Upon completing the edition of the picture J5550, the extractor's terminal 106 generates edited still image information 1402 as edit results. The extractor's terminal 106 generates extracted position information 1403 indicating the position on the original video image information from which the image is extracted. The extractor's terminal 106 then generates edit information 1404. The edit information 1404 indicates the edit operation performed on the data recorded on the edit recording unit 712 and the edit tool used in the edit operation.

The extracted position information 1403 indicates the position of the still image which is decomposed from the original video image information 1201 and which is counted from the head of the original video image information 1201. More specifically, the extracted position information 1403=5550 means that the still image is a 5550th image from the head. The edit information 1404 is described in the edit information of FIG. 11. Since the partial expansion is performed in FIG. 14, the edit information 1404 becomes close to the edit information 1101.

The generated edited still image information 1402 is stored on the storage unit 709. The storage unit 709 also stores, as the verification information of the edited extracted information, the extracted still image information 1401, the extracted position information 1403, the edit information 1404, and the digital signature information of the original video image information 1201. The digital signature system 100 generates the digital signature of the extractor's terminal 106 with the extracted still image information 1401, the extracted position information 1403, and the edit information 1404 as being a signing target 1405 in a manner such that a person in charge of editing is clarified.

Figure 15:
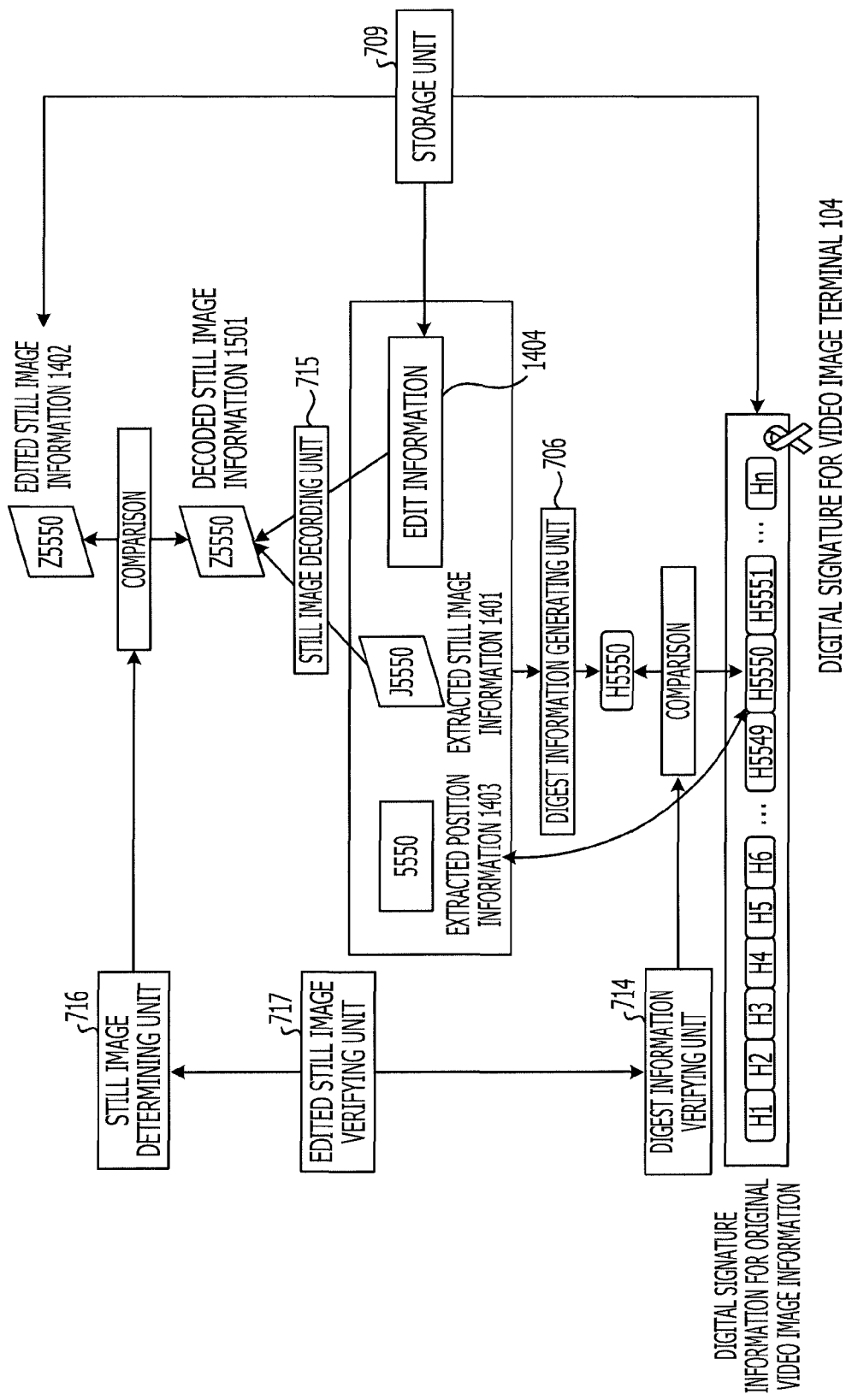
FIG. 15 diagrammatically illustrates a verification process of the extracting still image information.

FIG. 15 diagrammatically illustrates the verification process of the extracted still image information. An image as a verification target is the edited still image information 1402. The still image verifying apparatus 107 acquires the verification information of the edited extracted information stored on the storage unit 709 in order to verify the edited still image information 1402.

Upon acquiring the verification information, the digest information generator unit 706 in the still image verifying apparatus 107 generates hash H5550 from the extracted still image information 1401. The digest information verifying unit 714 in the still image verifying apparatus 107 compares the generated hash H5550 with the hash H5550 present at the position of the extracted position information 1403 within the digital signature information with respect to the original video image information 1201 to determine whether the generated hash H5550 matches the hash H5550 at the position of the extracted position information 1403.

It the two hashes H5550 match each other, the still image decoding unit 715 in the still image verifying apparatus 107 generates decoded still image information 1501 from the verified extracted still image information 1401 and the edit information 1404. The still image determining unit 716 in the still image verifying apparatus 107 compares the edited still image information 1402 with the decoded still image information 1501 for matching. If the digest information verifying unit 714 has verified the authenticity of the image data and the still image determining unit 716 has successfully determined that the image data matches, the edited still image verifying unit 717 in the still image verifying apparatus 107 determines that the authenticity of the edited still image information 1402 has been verified.

Figure 16:
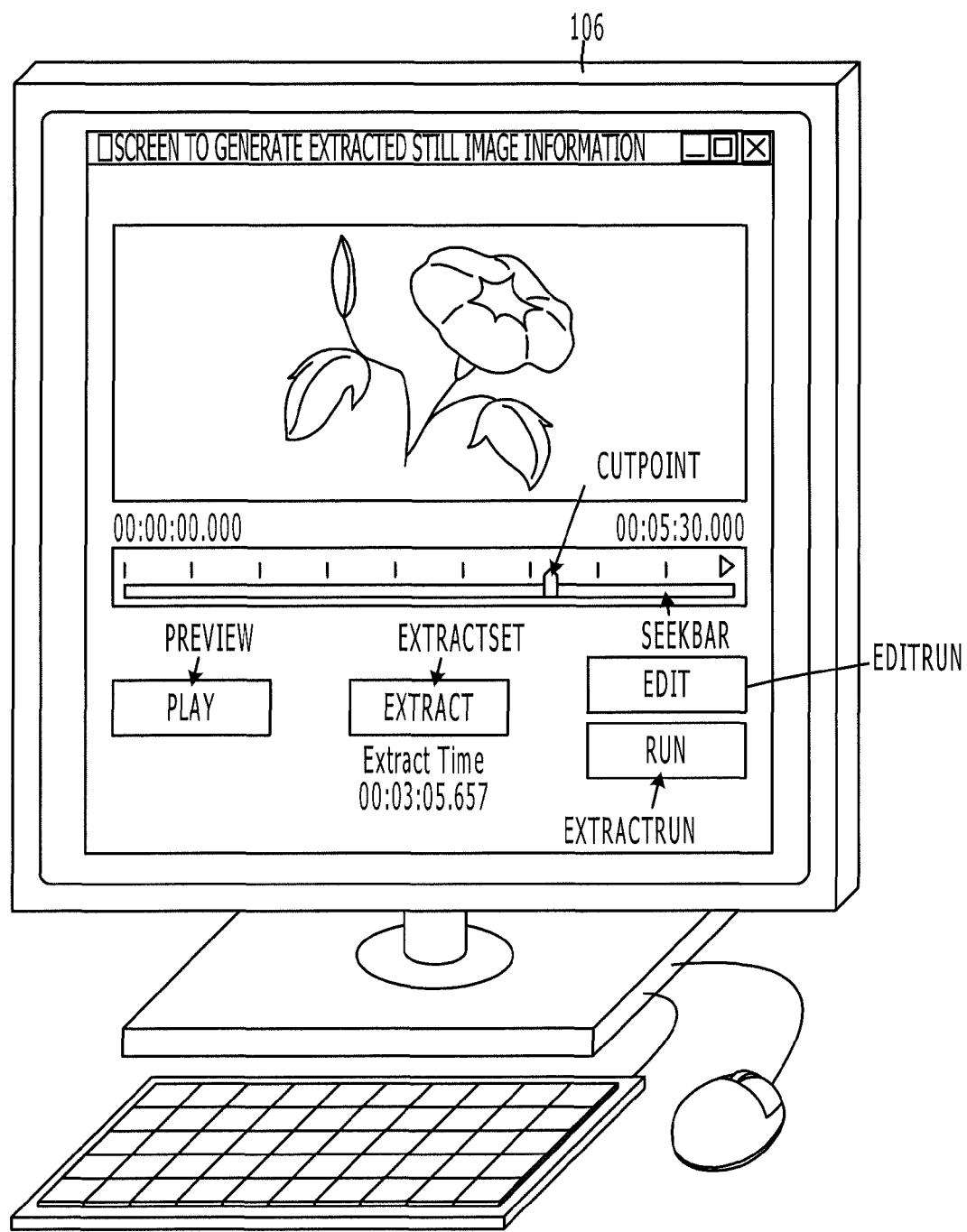
FIG. 16 illustrates an extracting process of original video image information.

FIG. 16 illustrates an extracting process of the original video image information. The image displayed on the extractor's terminal 106 of FIG. 16 is a generating screen of the extracted still image information. The extractor's terminal 106 reproduces the original video image information in response to the pressing of a play (PREVIEW) button. The extractor specifies an extracted position by an extracted instruction on the extracting terminal 106 reproducing the original video image information while viewing the screen. In the extracting process, a seekbar cursor is moved to the extracted position on the extractor's terminal 106 and an extract (EXTRACTSET) button is pressed at the extracted position. The extracted position is thus specified.

The extracted position (CUTPOINT) is thus specified. With a run button (EXTRACTRUN) pressed, the extractor's terminal 106 generates the extracted still image information. To perform an edit process on the extracted still image information, an edit (EDITRUN) button is pressed on the extractor's terminal 106. The extractor's terminal 106 thus shifts to an edit screen of the extracted still image information. The following discussion is based on the premise that the edit process is performed on the extracted still image information.

Figure 17:
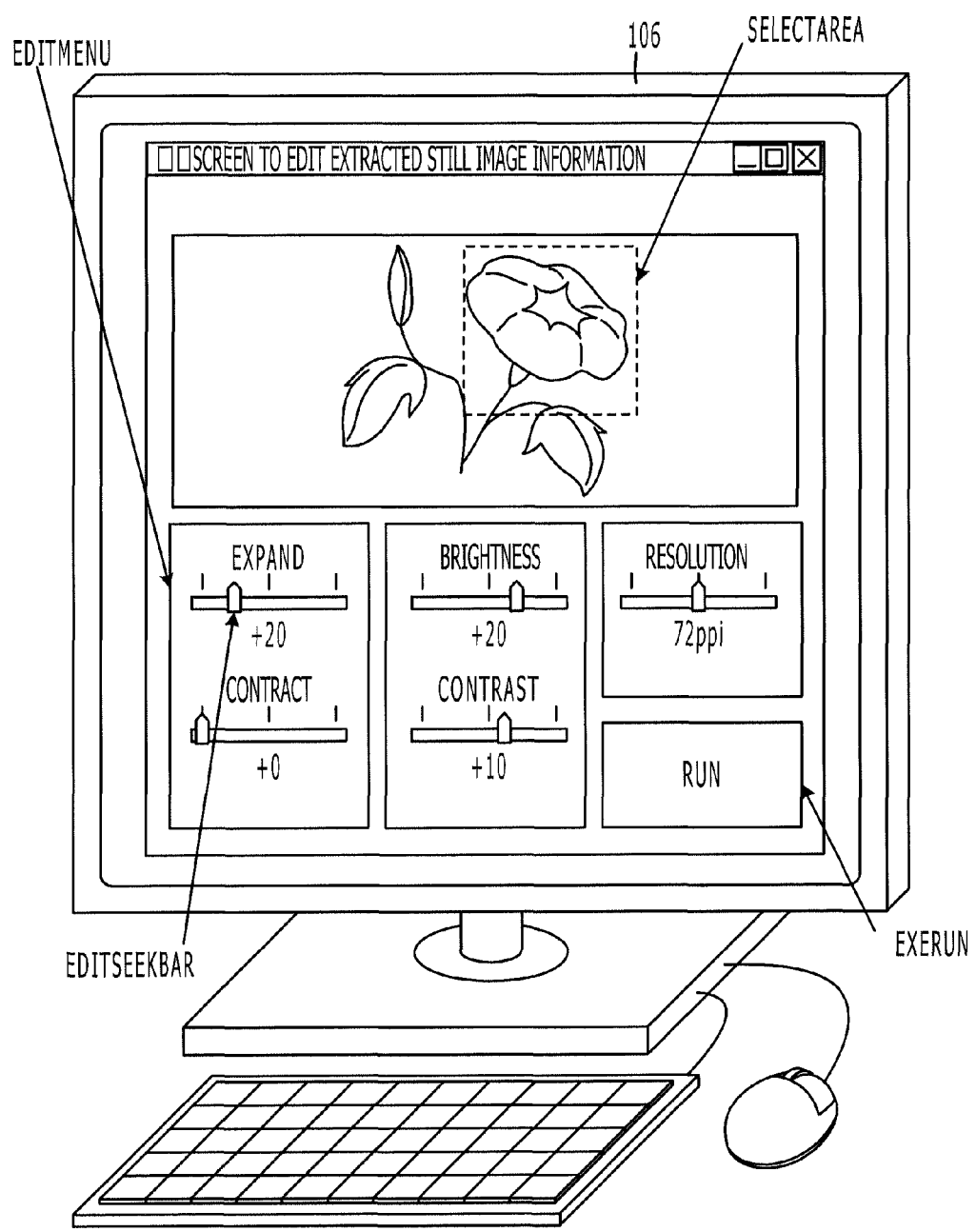
FIG. 17 illustrates an edit process of edit information of extracting still image information.

FIG. 17 diagrammatically illustrates the edit process of the edit information of the extracted still image information. The screen displayed on the extractor's terminal 106 of FIG. 17 is an edit screen of the extracted still image information. As illustrated in FIG. 17, the extractor's terminal 106 has edit functions (EDITMENU) including expanding or contracting the still image information, and modifying brightness, contrast, and resolution of the still image information. The actual operations of the edit process may be performed by using seekbars (EDITSEEKBAR), by numerically specifying a target value, and by specifying a selection range on the still image information displayed on the screen. For partial expansion, the extractor determines an expansion area (SELECTAREA) by selecting the area using the mouse on the extractor's terminal 106.

After the edit process, the extractor's terminal 106 generates information to the effect that further edit process has been performed, and edited extracted still image information in response to the run button (EXERUN). After the generating, the extractor's terminal 106 transmits to the video extracting apparatus 105 the information to the effect that further edit process has been performed, the edited extracted still image information, the extracted position information of the original video image information, and the edit information. While particular edit operations are described herein, the present invention is not limited to any particular edit operations or technique of implementing the edit operations.

Figure 18:
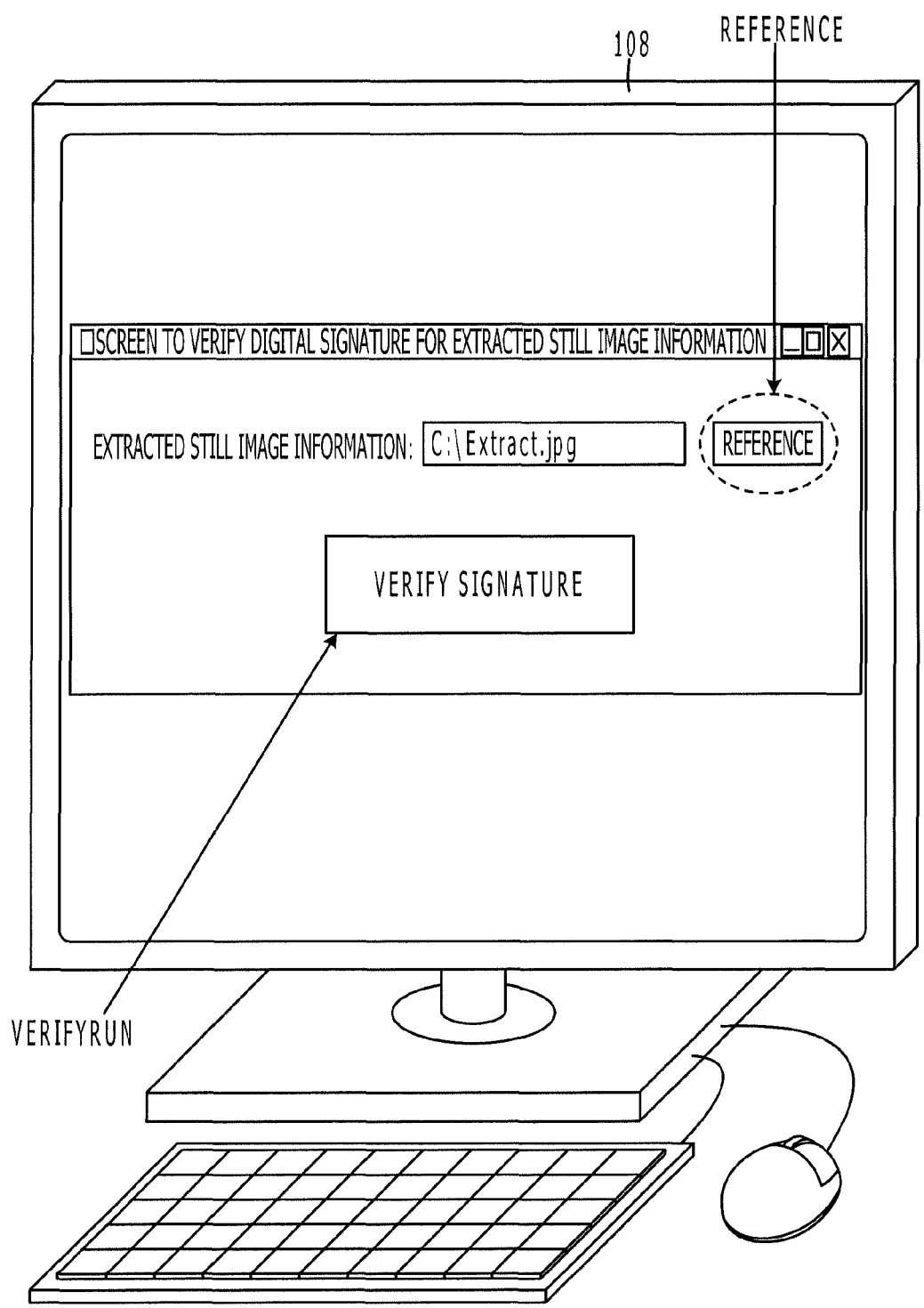
FIG. 18 illustrates a selection screen of extracting still image information as a verification target.

FIG. 18 diagrammatically illustrates a selection screen of the extracted still image information as a verification target. The screen displayed on the verifying terminal 108 of FIG. 18 is a digital signature verification screen of the extracted still image information. The verifying terminal 108 displays a file serving as the extracted still image information on an explorer in response to the pressing of the reference (REFERENCE) button. The verifier can thus select the extracted still image information as a verification target. The selected extracted still image information refers to public edited extracted still image information. By selecting the edited extracted still image information, the verifying terminal 108 acquires verification information of the edited extracted still image information incidental to the still image.

Upon selecting the still image information, the verifying terminal 108 performs the digital signature verification process on the selected extracted still image information in response to the pressing of a digital signature verification button (VERIFYRUN). The flowchart of the digital signature verification process of the extracted still image information is described with reference to FIG. 27. The verification results of the digital signature verification process are discussed with reference to FIG. 19.

Figure 19:
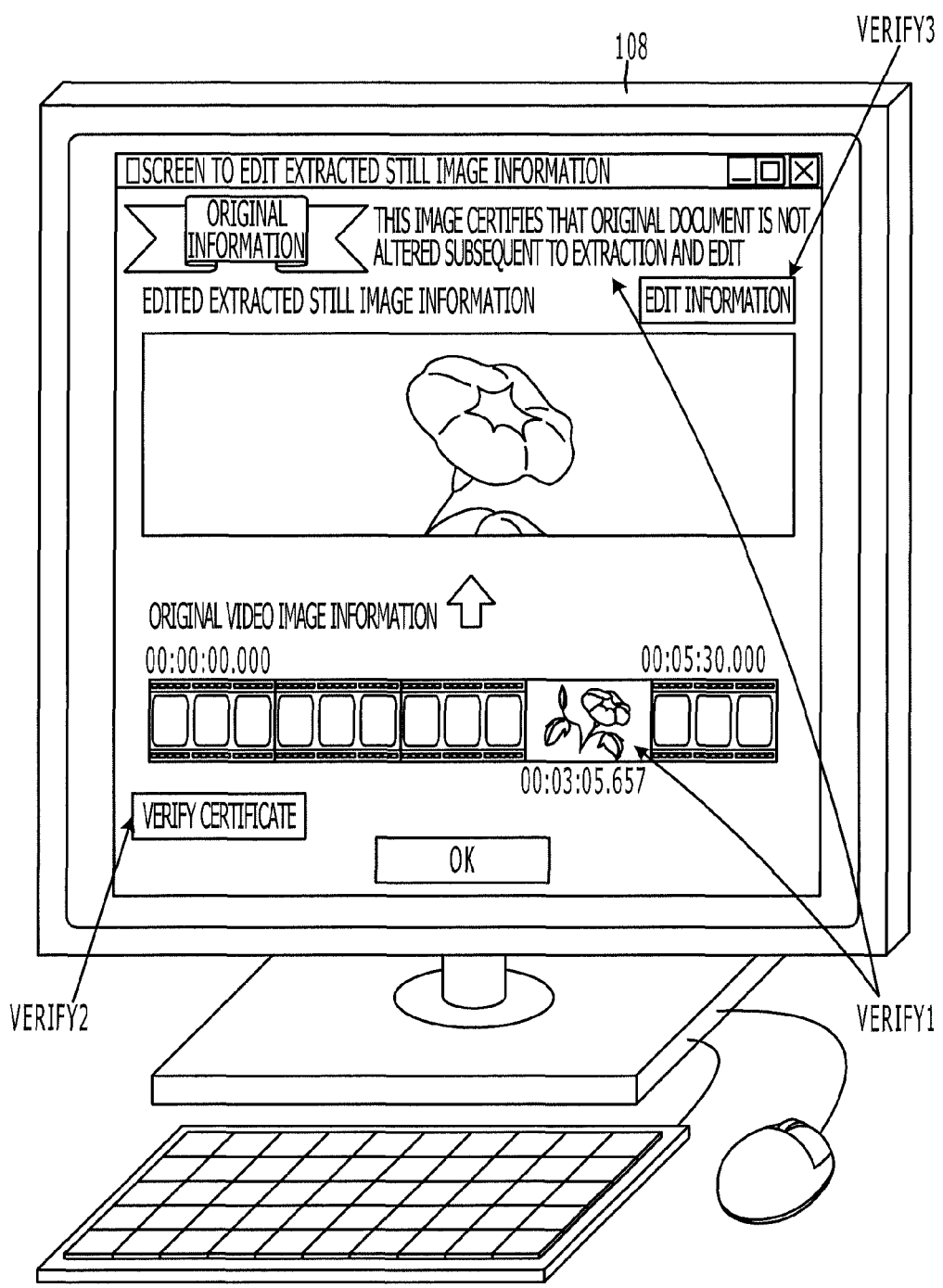
FIG. 19 illustrates verified results of extracted still image information.

FIG. 19 illustrates the verification results of the extracted still image information. The screen on the verifying terminal 108 of FIG. 19 is a digital signature verification result screen of the extracted still image information. The verifying terminal 108 displays the verification results and convinces the verifier that the extracted still image information is still image information with part of the original video image information thereof extracted and edited, and that the extracted still image information is not altered subsequent to the extracting and edit. The verifying terminal 108 displays the extracted position information indicating the extracted portion of the original video image information, and thus allows the verifier to confirm the extracted position (VERIFY1).

In response to the pressing of a verification certificate button, the verifying terminal 108 displays the digital signature information of the original video image information and the verifier can recognize who has produced the original video image information (VERIFY2). According to the embodiment, the verifier can recognize that the person in charge of production has produced the original video image information. In response to the pressing of an edit information button, the verifying terminal 108 displays the edit information indicating the edit operation performed subsequent to the extracting of the original video image information. The verifier can recognize the edit information (VERIFY3).

With the apparatuses and the configuration thereof, the digital signature system 100 thus performs the generating process and the digital signature verification process of the original video image information, and the generating process, the edit process, and the verification process of the extracted still image information. The processes are described with reference to flowcharts of FIGS. 20-29 (20-24, 25A, 25B and 26-29). An arrow-headed broken line in each chart represents the transmission or reception of data between a plurality of apparatuses.

In the generating process of the original video image information, the digital signature of the original video image information is generated. Included in the generating process are a video restoration process of the original video image information, an independent frame generating process, and a digital signature generating process. The digital signature verification process of the original video image information includes a video restoration process of the original video image information, and an independent frame generating process. The generating process, and the edit process of the extracted still image information includes a digital signature verification process of the original video image information. The verification process of the extracted still image information includes a digital signature verification process of the original video image information, a generating process of restoration still image information, and an originality partial verification process of the edited still image information. In the digital signature generating process and the digital signature verification process, a transmission and reception process of digitally signed information of FIG. 21, and a verification process of a receiving apparatus may be performed after a public key registration process of FIG. 20.

Figure 20:
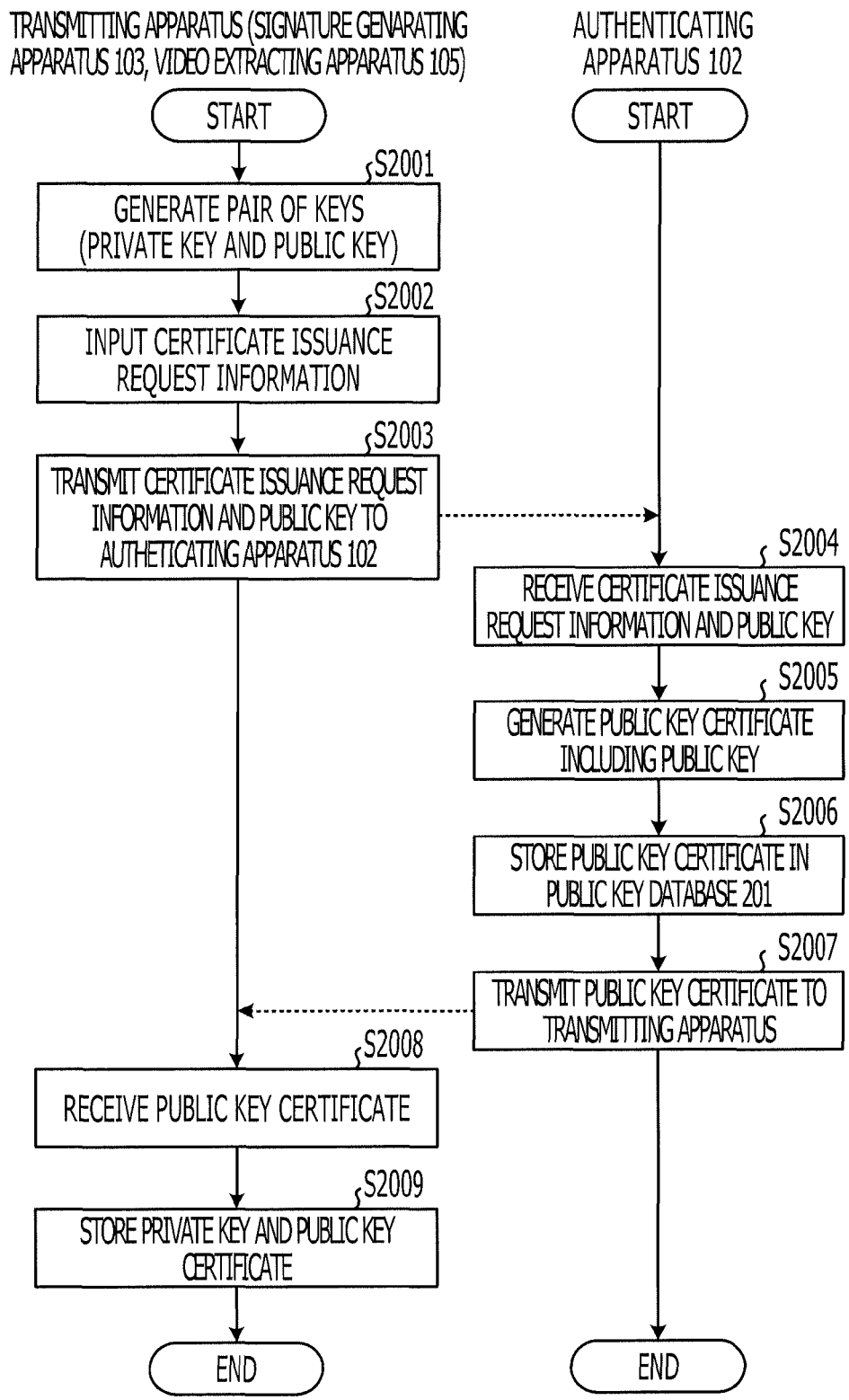
FIG. 20 is a flowchart illustrating a registration process of a public key of a digital signature.

FIG. 20 illustrates a flowchart of the public key registration process of the digital signature. The flowchart of FIG. 20 indicates a registration flow of a public key between the transmitting apparatus and the authenticating apparatus 102. According the embodiment, each of the digital signature generating apparatus 103 and the video extracting apparatus 105 forms the transmitting apparatus of the digital signature.

The transmitting apparatus generates a key pair (a private key and a public key) (S2001). The transmitting apparatus input certificate issue request information (S2002). The information to be input is related to the video image recording terminal 104 and the extractor's terminal 106. If a plurality of video image recording terminals 104 are present, certificate issue request information may be input for each of the video image recording terminals 104. If a plurality of users use the extractor's terminal 106, the certificate issue request information may be input for each of the users, and each user has his own public key. Upon inputting the certificate issue request information, the transmitting apparatus transmits to the authenticating apparatus 102 the input certificate issue request information and the public key (S2003).

The communicating unit 204 in the authenticating apparatus 102 receives the input certificate issue request information and the public key (S2004). The certificate issuing unit 202 in the authenticating apparatus 102 generates a public key certificate including the public key (S2005), and stores the generated public key certificate on the public key DB 201 (S2006). The certificate issuing unit 202 then controls the communicating unit 204, thereby transmitting the issued public key certificate via the network 101 to the transmitting apparatus having transmitted the certificate issue request information (S2007).

The transmitting apparatus having received the public key certificate (S2008) stores on a storage device thereof the private key generated in S2001 and the public key certificate issued from the authenticating apparatus 102 (S2009). The transmitting apparatus thus completes the process thereof. The digital signature generating apparatus 103 has, as a storage area thereof, a storage area in the digital signature generator unit 303, and the video extracting apparatus 105 has, as a storage area thereof, a storage area in the digital signature generator unit 303.

Figure 21:
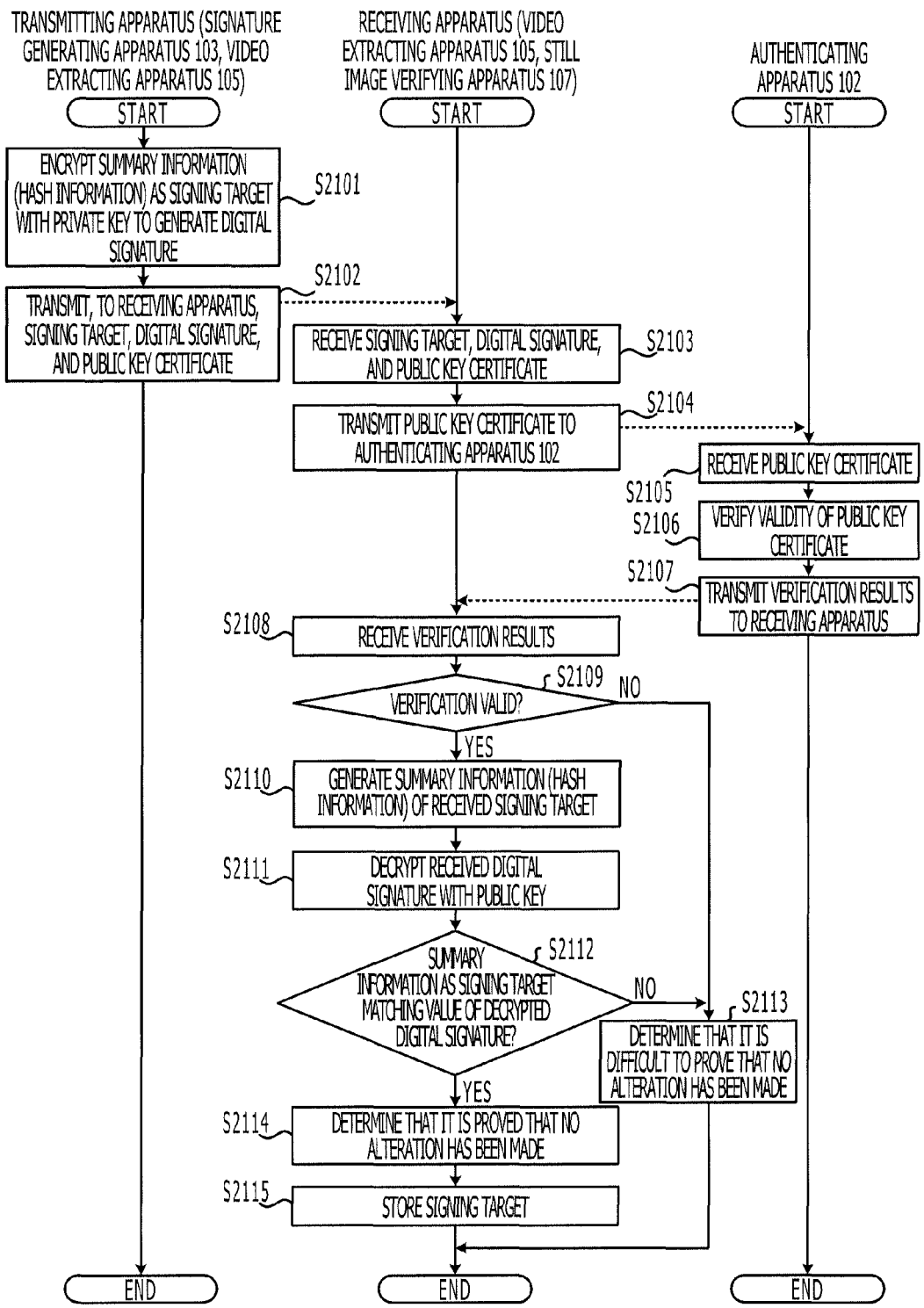
FIG. 21 is a flowchart illustrating a transmission and reception process of information with digital signature and a verification process of a receiving apparatus.

FIG. 21 illustrates a flowchart of the transmission and reception process of the digitally signed information and the verification process of the receiving apparatus. The flowchart of FIG. 21 thus represents the transmission and reception process of the digitally signed information performed between the transmitting apparatus and the receiving apparatus, and the verification process of the digital signature performed between the receiving apparatus and the authenticating apparatus 102. According to an embodiment, each of the digital signature generating apparatus 103 and the video extracting apparatus 105 serves as the transmitting apparatus while each of the video extracting apparatus 105 and the still image verifying apparatus 107 serves as the receiving apparatus responding to the transmitting apparatus.

The transmitting apparatus encrypts the summary information as a signing target (hash information) with the private key stored on the storage area (S2101). The encrypted information becomes a digital signature. The transmitting apparatus transmits to the receiving apparatus the signing target, the digital signature, and the public key certificate also stored on the storage area (S2102).

The receiving apparatus receives the signing target, the digital signature, and the public key certificate (S2103). The receiving apparatus transmits the public key certificate to the authenticating apparatus 102 in order to check the expiration date of the received public key certificate, and invalidity information (S2104). According an embodiment, the authenticating apparatus 102 supports a series of functions of certificate issuing and certificate verification. The authenticating apparatus 102 receives the public key certificate (S2105), verifies the validity of the public key (S2106), and transmits the verification results to the receiving apparatus (S2107).

The receiving apparatus receives the verification results (S2108), and checks the validity of the public key (S2109). If the verification results indicates invalidity (no from S2109), the receiving apparatus finds it difficult to guarantee no alteration (S2113), and ends the process thereof. If the verification results indicates validity (yes from S2109), the receiving apparatus generates the summary (hash information) information of the received signing target (S2110), and then decrypts the received digital signature with the public key (S2111). The receiving apparatus determines whether the generated summary information of the signing target matches the value of the digital signature decrypted with the public key (S2112).

If the two pieces of information fail to match each other (no from S2112), the receiving apparatus proceeds to S2113. The receiving apparatus thus ends the process thereof. If the two pieces of information match each other (yes from S2112), the receiving apparatus determines that it is proved that no alteration has been made (S2114). The receiving apparatus stores the signing target (S2115) and ends the process thereof. Subsequent to S2113, the video extracting apparatus 105 may perform a notification process notifying the operation terminal of the receiving apparatus, such as the extractor's terminal 106 of a massage to the effect that the digital signature is not authenticated, and the still image verifying apparatus 107 may perform a notification process notifying the operation terminal of the receiving apparatus, such as the verifying terminal 108 of a massage to the effect that the digital signature is not authenticated.

Figure 22:
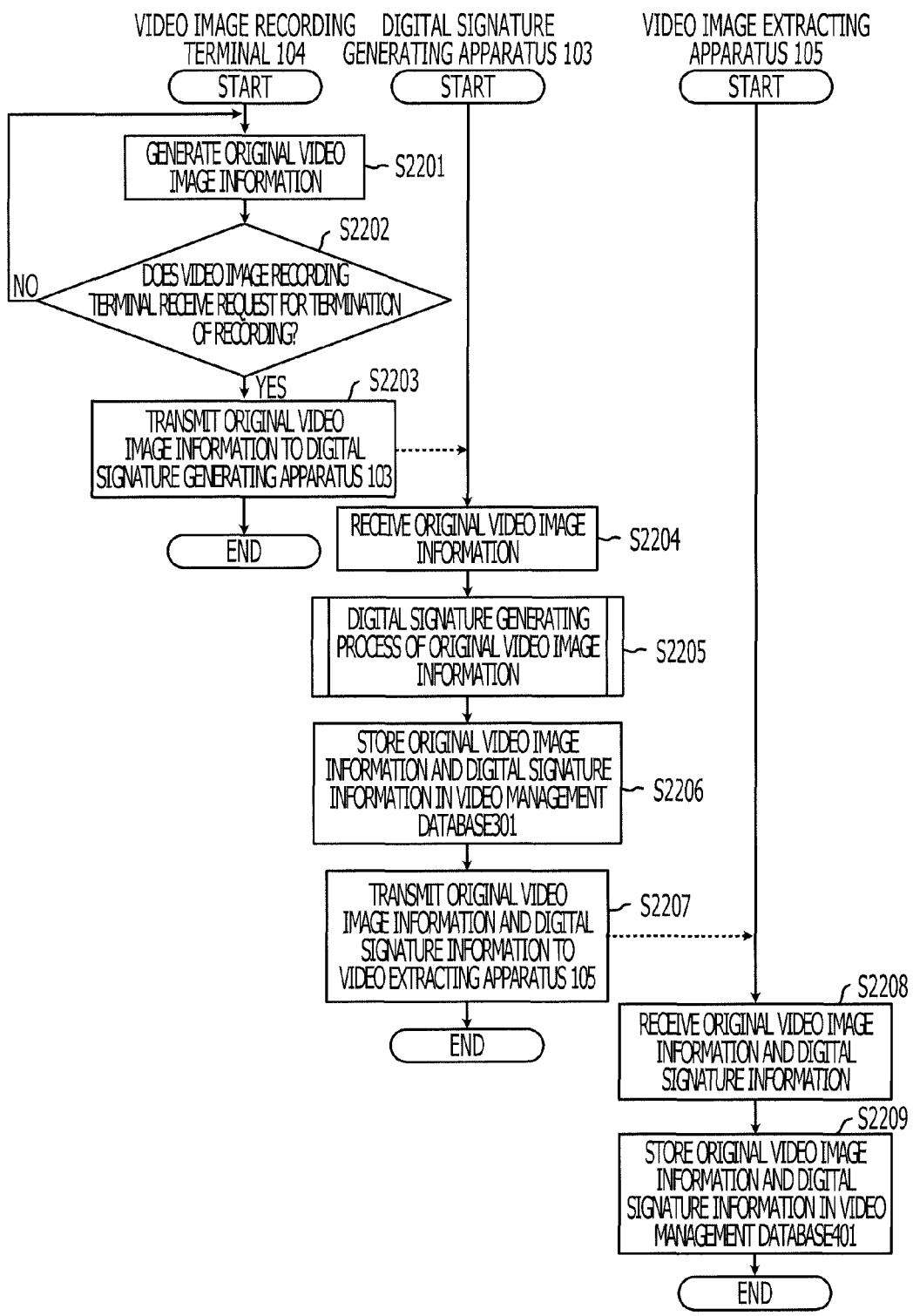
FIG. 22 is a flowchart illustrating a generating process of the original video image information.

FIG. 22 is a flowchart of the generating process of the original video image information. The video image recording terminal 104 generates the original video image information (S2201). Upon generating the original video image information, the video image recording terminal 104 determines whether a request to end recording has been received (S2202). If a request to end recording has not been received (no from S2202), the video image recording terminal 104 returns to S2201 and continues to generate the original video image information. If a request to end recording has been received (yes from S2202), the video image recording terminal 104 transmits the generated original video image information to the digital signature generating apparatus 103 (S2203), and ends the process thereof.

The digital signature generating apparatus 103 receives the original video image information (S2204). The digital signature generating apparatus 103 performs the digital signature generating process on the received original video image information (S2205). The digital signature generating process of the original video image information is described below with reference to FIG. 23. Subsequent to the digital signature generating process, the digital signature generating apparatus 103 stores the original video image information and the digital signature information onto the video image management DB 301 via the video image management TB 302 (S2206). Subsequent to the storage, the digital signature generating apparatus 103 transmits the original video image information and the digital signature information to the video extracting apparatus 105 (S2207) and ends the process thereof.

The video extracting apparatus 105 receives the original video image information and the digital signature information (S2208), stores the received original video image information and digital signature information onto the video image management DB 401 via the video image management TB 402 (S2209), and ends the process thereof. Upon receiving the request to end recording in the embodiment, the video image recording terminal 104 transmits the original video image information at a time. Alternatively, the video extracting apparatus 105 may transmit to the digital signature generating apparatus 103 frames, encoded in accordance with MPEG, successively on a per GOP unit basis.

Figure 23:
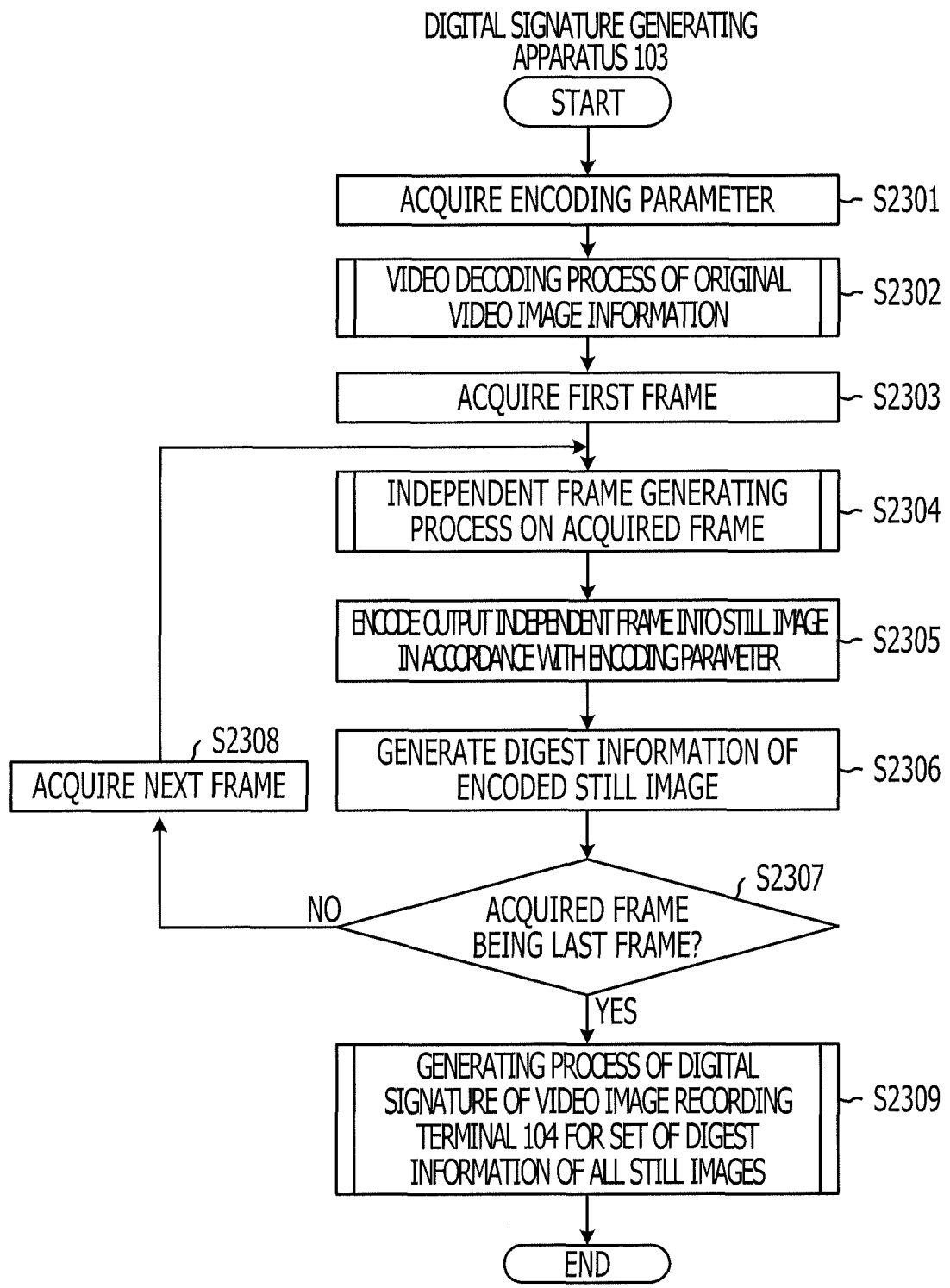
FIG. 23 is a flowchart illustrating a digital signature generating process of original video image information.

FIG. 23 is a flowchart illustrating the digital signature generating process of the original video image information. In the digital signature generating process of the original video image information, the original video image information is acquired through the generating process of the original video image information. The digital signature generating apparatus 103 acquires an encoding parameter (S2301). Subsequent to the acquisition of the encoding parameter, the digital signature generating apparatus 103 performs a video decoding process on the original video image information (S2302). The video decoding process is described with reference to states 1001 and 1002 in FIG. 10. More specifically, the digital signature generating apparatus 103 performs the decoding process in accordance with a format of the original video image information, determines which picture is I, P, and B picture, and rearranges the frames in the time-series order if the frames are not in the time-series order.

If the original video image information is ready to be acquired on a per frame basis in S2302, the digital signature generating apparatus 103 acquires a leading frame (S2303). The digital signature generating apparatus 103 performs an independent frame generating process on the acquired frame (S2304). The independent frame generating process is described below with reference to FIG. 24.

The digital signature generating apparatus 103 encodes the output independent frame into a still image in accordance with the encoding parameter (S2305). The digital signature generating apparatus 103 JPEG encodes each of the I, P, and B pictures if the image format is JPEG, thereby generating still image information. The digital signature generating apparatus 103 generates the digest information of the encoded still image (S2306). Subsequent to the generating of the digest information, the digital signature generating apparatus 103 determines whether the acquired frame is last frame (S2307). If the next frame is present (no from S2307), the digital signature generating apparatus 103 acquires the next frame (S2308), and proceeds to S2304.

If the acquired frame is last frame (yes from S2307), the digital signature generating apparatus 103 generates the digital digital signature of the video image recording terminal 104 for a set of digest information of all the still images (S2309), and ends the process thereof.

FIG. 24 is a flowchart of the independent frame generating process. The independent frame generating process is performed by the digital signature generating apparatus 103 and the video extracting apparatus 105 as well. The digital signature generating apparatus 103 determines whether the acquired frame is an I picture (S2401). The I picture here includes the IDR picture.

If the acquired frame is an I picture (yes from S2401), the digital signature generating apparatus 103 converts the acquired frame into an independent frame (S2407). If the acquired frame is one of the P and B pictures (no from S2401), the digital signature generating apparatus 103 acquires, as a frame, a forward I picture or P picture (S2402). The word forward means past in the time axis.

The digital signature generating apparatus 103 determines whether the acquired frame is a P picture (S2403). If the acquired frame is a P picture (yes from S2403), the digital signature generating apparatus 103 converts the forward frame and the acquired frame into an independent frame (S2406). If the acquired frame is a B picture (no from S2403), the digital signature generating apparatus 103 acquires, as a frame, a backward I picture or P picture (S2404). Subsequent to the acquisition of the frame, the digital signature generating apparatus 103 converts the forward frame, the backward frame, and the acquired frame into an independent frame (S2405).

Subsequent to one of S2407, S2406, and S2405, the digital signature generating apparatus 103 outputs the independent frame (S2408), and ends the process thereof. The specific conversion example in each of S2407, S2406, and S2405 is the process performed from state 1003 to state 1004 in FIG. 10.

Figure 25A:
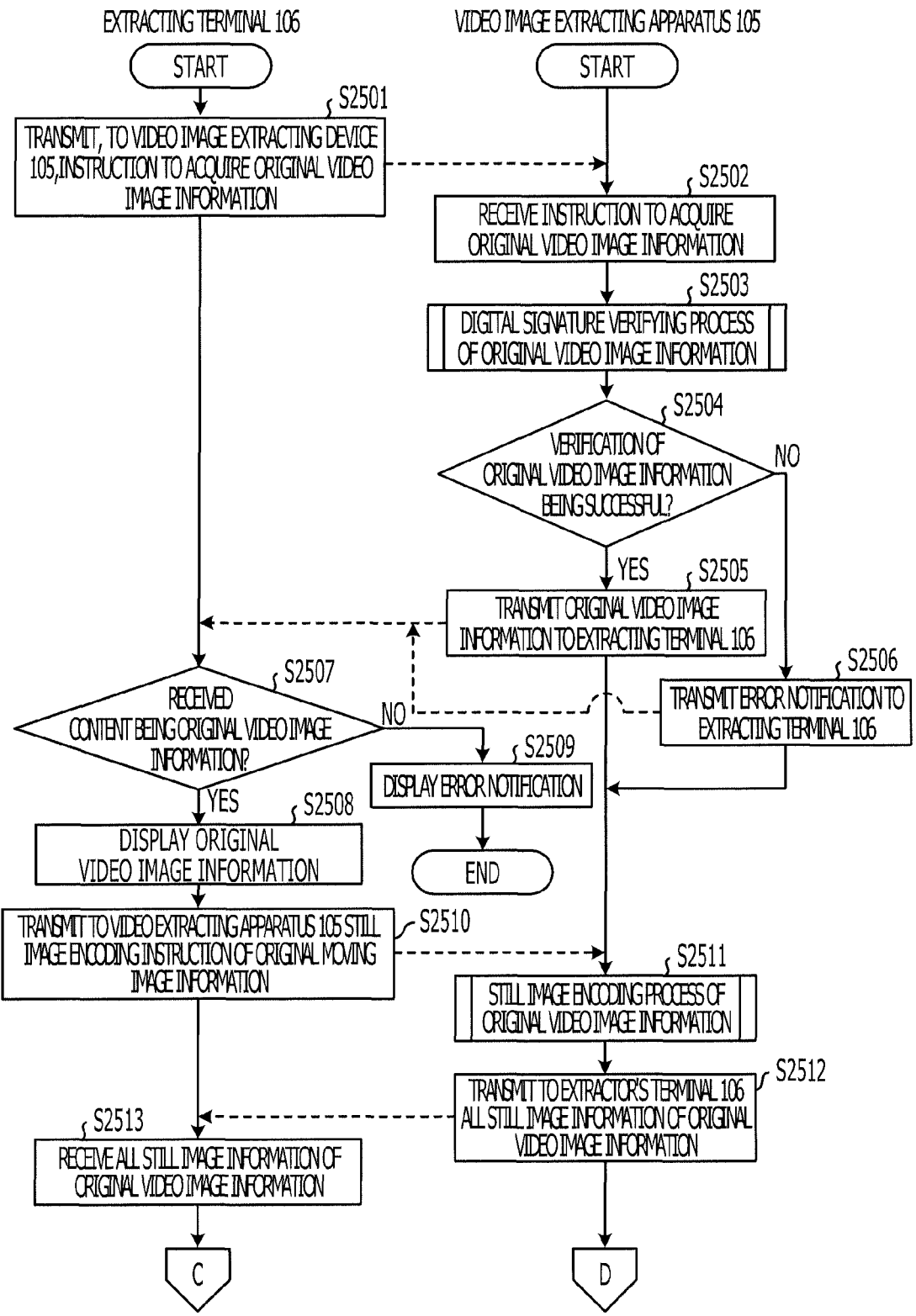
FIGS. 25A and 25B are flowcharts illustrating a generating process and an edit process of the extracting still image information, where
Figure 25B:
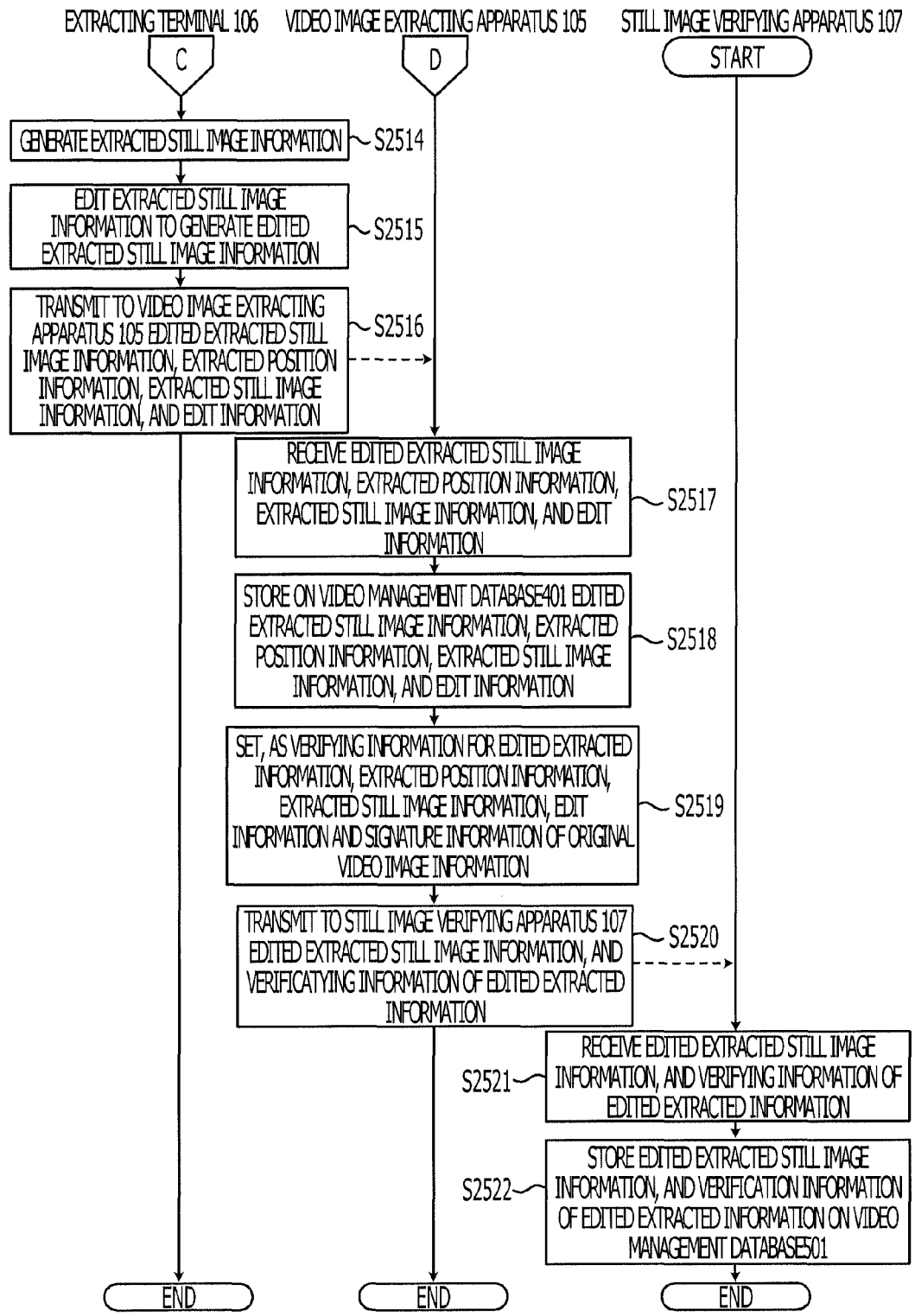

FIGS. 25A and 25B are a flowchart of the generating process and the edit process of the extracted still image information. The original video image information is used to perform the generating process and the edit process on the extracted still image information. The original video image information is acquired as illustrated in FIG. 25A, and the extracted still image information is generated and edited as illustrated in FIG. 25B.

Referring to FIG. 25A, the extractor's terminal 106 transmits to the video extracting apparatus 105 an extracted instruction of the original video image information as an extracting target (S2501). Subsequent to the transmission of the extracted instruction, the extractor's terminal 106 waits on standby for a response from the video extracting apparatus 105.

The video extracting apparatus 105 receives the extracted instruction of the original video image information as the extracting target (S2502). Upon receiving the extracted instruction, the video extracting apparatus 105 retrieves the original video image information as an extracting target and the digital signature information, stored on the video image management DB 401, via the video image management TB 402, and performs the digital signature verification process on the original video image information with the digital signature verifying unit 404 (S2503). The digital signature verification process on the original video image information is described in detail with reference to FIG. 26. The digital signature verification process is performed before the extracting process to verifies that the original video image information is free from alteration.

Upon completing the digital signature verification process on the original video image information, the video extracting apparatus 105 determines whether the original video image information has been successfully verified (S2504). If the original video image information has been successfully verified (yes from S2504), the video extracting apparatus 105 transmits the original video image information to the extractor's terminal 106 (S2505). If the original video image information has not been verified (no from S2504), the video extracting apparatus 105 transmits an error notification to the extractor's terminal 106 (S2506).

The extractor's terminal 106 checks the content received from the video extracting apparatus 105 (S2507). If the received content is the original video image information (yes from S2507), the extractor's terminal 106 displays the original video image information (S2508). If the received content is not the original video image information (no from S2507), the extractor's terminal 106 has received the error notification, and thus displays the error notification (S2509). The extractor's terminal 106 thus ends the process thereof.

Upon displaying the original video image information, the extractor's terminal 106 transmits a still image encoding instruction of the original video image information to the video extracting apparatus 105 (S2510). Upon receiving the still image encoding instruction of the original video image information, the video extracting apparatus 105 performs a still image encoding process on the original video image information (S2511). The still image encoding process of the original video image information is identical to the digital signature generating process of the original video image information excluding operations in S2306 and S2309 illustrated in FIG. 23. Upon encoding the still image, the video extracting apparatus 105 transmits all still image information of the original video image information to the extractor's terminal 106 (S2512). The extractor's terminal 106 receives all still image information of the original video image information (S2513). The extractor's terminal 106 generates the extracted still image information based on all still image information of the original video image information.

The extractor's terminal 106 extracts a still image from all still image information of the original video image information and then generates extracting information. In S2510, the extractor's terminal 106 may transmit, together with the still image encoding instruction, position information of the frame of the original video image information to be extracted. Upon receiving the position information, the video extracting apparatus 105 may encode only the frame responsive to the position information. More specifically, in the still image encoding process of the original video image information, the video extracting apparatus 105 executes S2303 to "acquire a frame responsive to the position information" and then performs a yes loop from S2307. In this way, the video extracting apparatus 105 encodes only the still image satisfying the position information.

As illustrated in FIG. 25B, the extractor's terminal 106 generates the extracted still image information (S2514). The generating process of the extracted still image information has been described with reference to FIG. 14. The operation of the extractor's terminal 106 has been described with reference to FIG. 16. In the embodiment, the frame 5550 is extracted.

Upon completing the generating of the extracted still image information, the extractor's terminal 106 edits the extracted still image information, and generates the edited extracted still image information (S2515). The generating process of the edited extracted still image information has been described with reference to FIG. 17. Upon completing the generating of the edited extracted still image information, the extractor's terminal 106 transmits to the video extracting apparatus 105 the edited extracted still image information, the extracted position information, the extracted still image information, and the edit information (S2516).

The video extracting apparatus 105 on standby then comes to receive the edited extracted still image information, the extracted position information, the extracted still image information, and the edit information (S2517). Upon receiving these pieces of information, the video extracting apparatus 105 stores onto the video image management DB 401 the edited extracted still image information, the extracted position information, the extracted still image information, and the edit information (S2518). Subsequent to the storage operation, the video extracting apparatus 105 sets, as the verification information of the edited extracted information, the extracted position information, the extracted still image information, the edit information, and the digital signature information of the original video image information (S2519). Upon setting the verification information, the video extracting apparatus 105 transmits to the still image verifying apparatus 107 the edited extracted still image information and the verification information of the edited extracted information (S2520).

The still image verifying apparatus 107 on standby comes to receive the edited extracted still image information and the verification information of the edited extracted information (S2521). Upon receiving these pieces of information, the still image verifying apparatus 107 stores onto the video image management DB 501 the edited extracted still image information and the verification information of the edited extracted information (S2522). The generating process and the edit process of the extracted still image information are thus complete.

Figure 26:
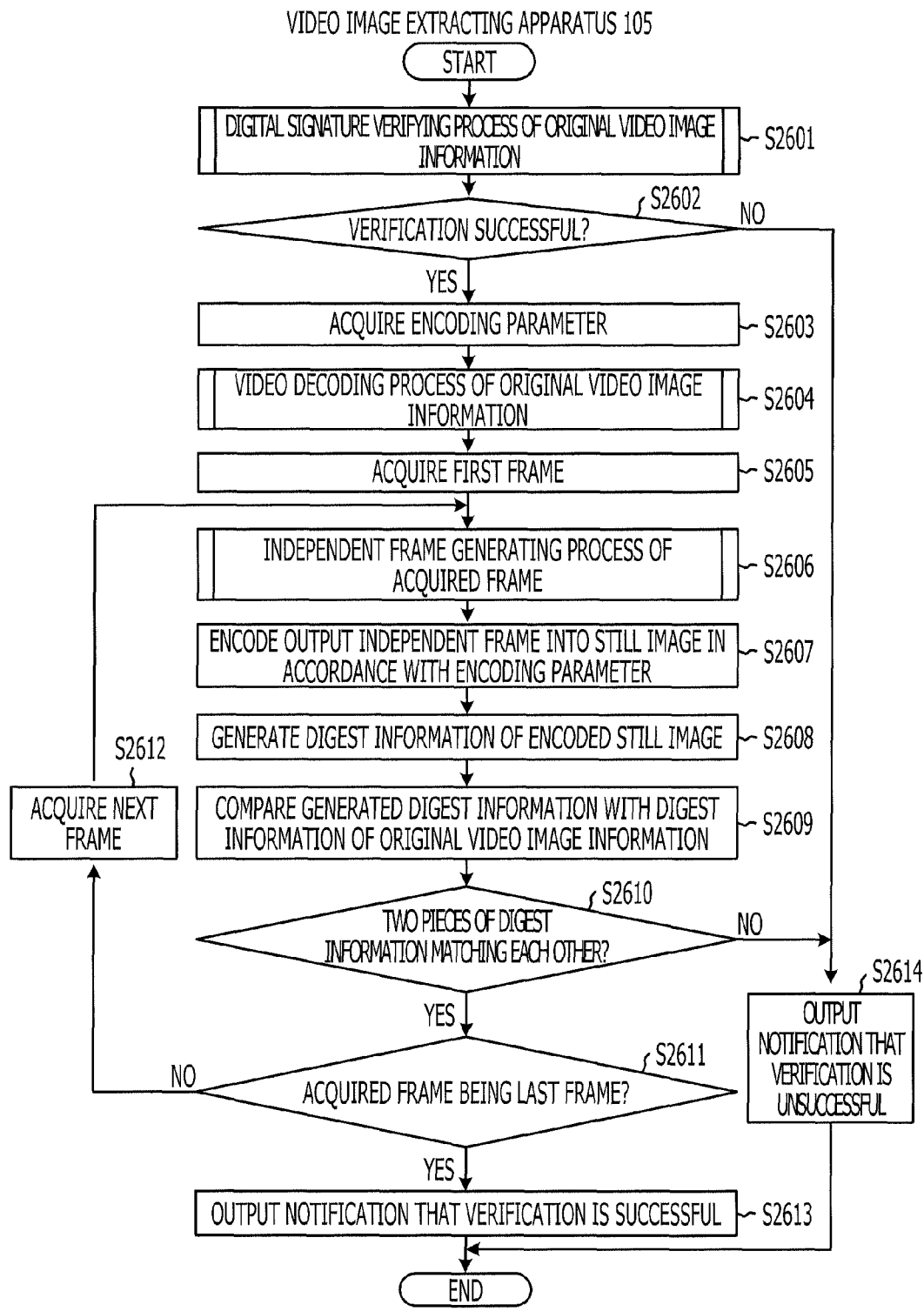
FIG. 26 is a flowchart illustrating a digital signature verification process of original video image information.

FIG. 26 is a flowchart illustrating the digital signature verification process of the original video image information. The digital signature verification process of the original video image information has also been described with reference to FIG. 13. The video extracting apparatus 105 performs the digital signature verification process on the original video image information (S2601). Upon the verification, the video extracting apparatus 105 checks the verification results (S2602). If the verification results indicate that the verification is not successful (no from S2602), the video extracting apparatus 105 outputs a notification to the effect that the verification is not successful (S2614), and ends the digital signature verification process of the original video image information. If the verification is not successful, the video extracting apparatus 105 may notify the extractor's terminal 106 of an indication that the original video image information has been altered.

If the verification is successful (yes from S2602), the video extracting apparatus 105 acquires the encoding parameter (S2603). The same information as the encoding parameter stored beforehand on the digital signature generating apparatus 103 needs to be stored on the video extracting apparatus 105.

The video extracting apparatus 105 performs the video decoding process on the received original video image information (S2604). The decoding process of the original video image information remains unchanged from the video decoding process of the original video image information in S2302 of FIG. 23. If the video extracting apparatus 105 is ready to receive the original video image information on a per frame basis in S2604, the video extracting apparatus 105 acquires a leading frame (S2605). The video extracting apparatus 105 performs an independent frame generating process on the acquired frame (S2606). The independent frame generating process has been described with reference to FIG. 24.

The video extracting apparatus 105 encodes the output independent frame into a still image in accordance with the encoding parameter (S2607). More specifically, the video extracting apparatus 105 JPEG encodes each of the I, P, and B pictures if the image format is JPEG, thereby generating still image information. The video extracting apparatus 105 generates the digest information of the encoded still image (S2608).

Upon generating the digest information, the video extracting apparatus 105 compares the generated digest information with the digest information stored in the digital signature information of the original video image information (S2609) and determines whether the pieces of digest information match each other (S2610). If any one of the pieces of digest information fails to match (no from S2610), the video extracting apparatus 105 determines that the original video image information has been altered, and proceeds to S2614.

If the pieces of digest information match each other (yes from S2610), the video extracting apparatus 105 determines whether the acquired frame is last frame (S2611). If the acquired frame is not last frame (no from S2611), the video extracting apparatus 105 acquires the next frame (S2612) and then returns to S2606. If the acquired frame is last frame (yes from S2611), the video extracting apparatus 105 outputs a notification to the effect that the verification is successful (S2613), and ends the digital signature verification process of the original video image information.

Figure 27:
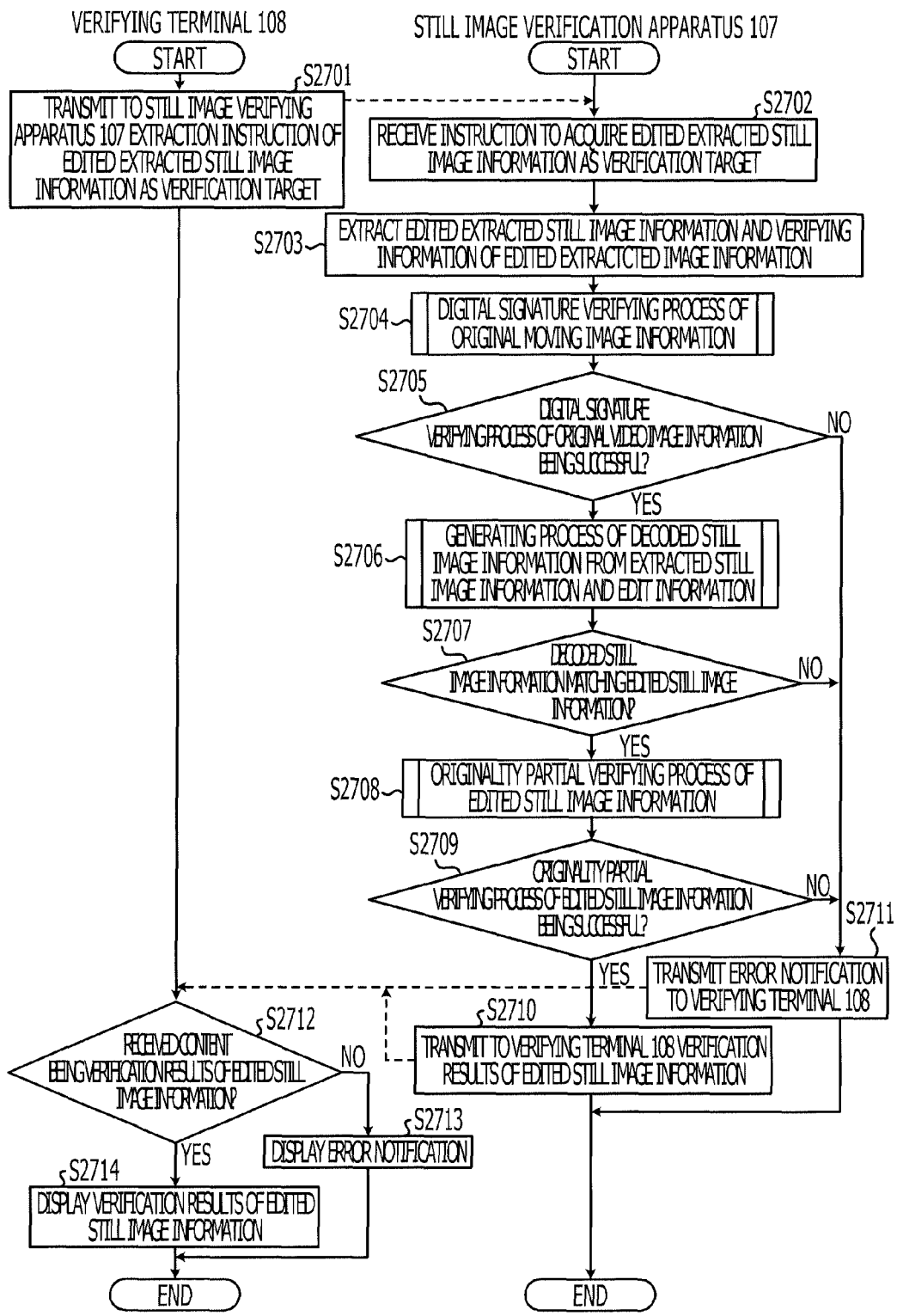
FIG. 27 is a flowchart illustrating a verification process of extracted still image information.

FIG. 27 is a flowchart illustrating the verification process of the extracted still image information. The verifying terminal 108 transmits to the still image verifying apparatus 107 an extracting instruction of the edited extracted still image information as a verification target (S2701). Upon transmitting the extracted instruction, the verifying terminal 108 waits on standby for an response from the still image verifying apparatus 107.

The still image verifying apparatus 107 receives the extracted instruction of the edited extracted still image information as the verification target (S2702). Upon receiving the instruction, the still image verifying apparatus 107 extracts the edited extracted still image information and the verification information of the edited extracted still image information (S2703). Upon extracting these pieces of information, the still image verifying apparatus 107 performs the digital signature verification process of the digital signature of the original video image information (S2704). Upon performing the verification process, the still image verifying apparatus 107 determines whether the digital signature verification process of the digital signature of the original video image information is successful (S2705). If the digital signature verification process of the digital signature of the original video image information is not successful (no from S2705), the still image verifying apparatus 107 transmits an error notification to the verifying terminal 108 (S2711).

If the digital signature verification process of the digital signature of the original video image information is successful (yes from S2705), the still image verifying apparatus 107 generates decoded still image information from the extracted still image information and the edit information (S2706). The generating process of the decoded still image information is described in detail below with reference to FIG. 28. Upon generating the decoded still image information, the still image verifying apparatus 107 determines whether the decoded still image information matches the edited still image information (S2707). If the two pieces of information match each other (yes from S2707), the still image verifying apparatus 107 performs a originality partial verification process on the edited still image information (S2708). The originality partial verification process of the edited still image information is described in detail below with reference to FIG. 29.

Upon completing the originality partial verification process, the still image verifying apparatus 107 determines whether the originality partial verification process of the edited still image information is successful (S2709). If the originality partial verification process of the edited still image information is successful (yes from S2709), the still image verifying apparatus 107 transmits to the verifying terminal 108 the verification results of the edited still image information (S2710). If the two pieces of information do not match each other (no from S2707), or if the originality partial verification is not successful (no from S2709), the still image verifying apparatus 107 proceeds to S2711.

The verifying terminal 108 on standby comes to verify the received content, and determines whether the received content is the verification results of the edited still image information (S2712). If the received content is the verification results of the edited still image information (yes from S2712), the verifying terminal 108 displays the verification results of the edited still image information (S2714), and ends the verification process of the edited still image information. The verification process of the edited still image information has also been discussed with reference to FIG. 19. If the received content is not the verification results of the edited still image information (no from S2712), the verifying terminal 108 display an error notification (S2713), and ends the verification process of the extracted still image information.

Figure 28:
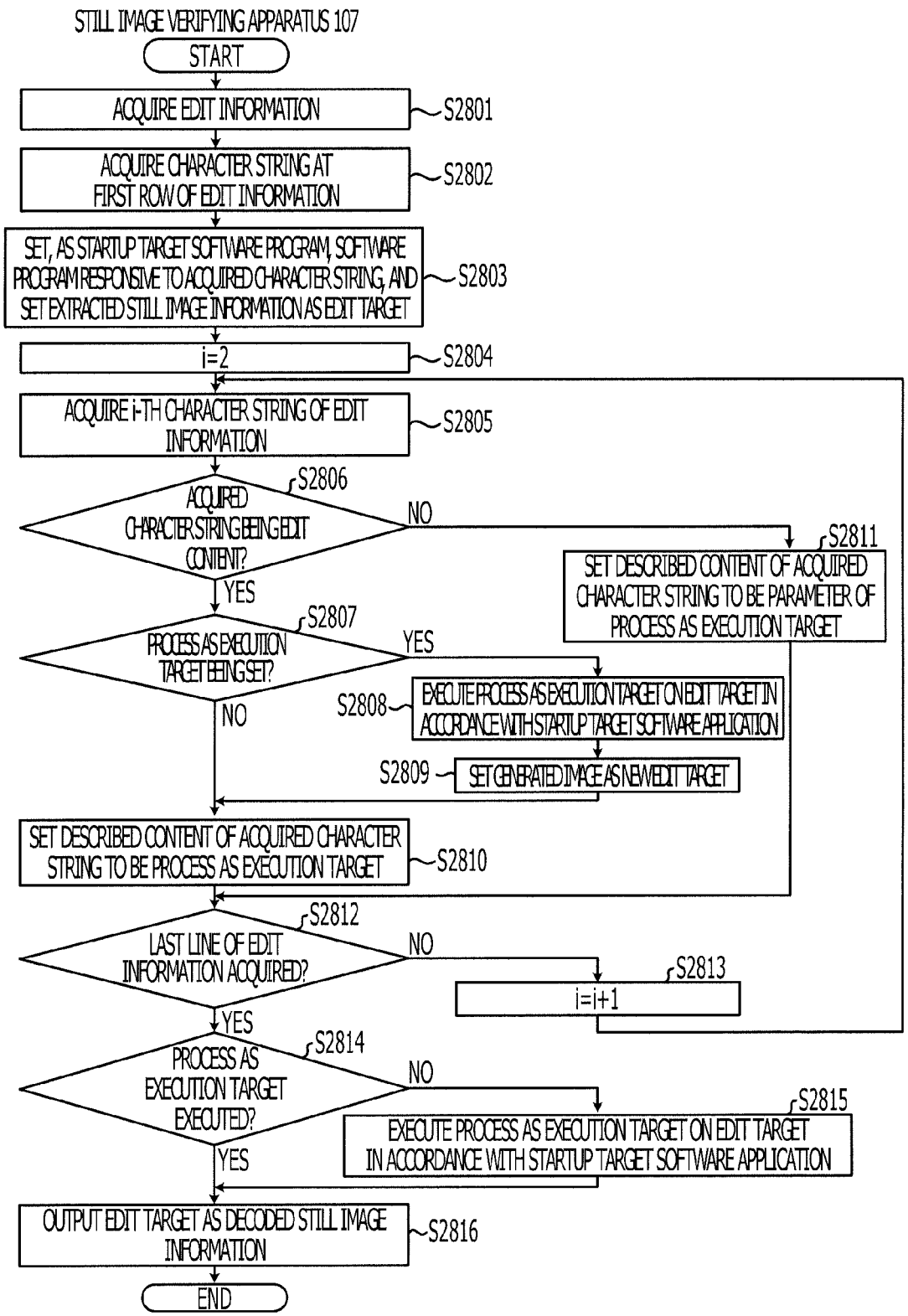
FIG. 28 is a flowchart illustrating a generating process of decoded still image information.

FIG. 28 is a flowchart illustrating the generating process of the decoded still image information. In the process of FIG. 28, the still image information is decoded using the edit information including edit content such as the edit information 1101 through the edit information 1103. The still image verifying apparatus 107 acquires the edit information (S2801). Upon acquiring the edit information, the still image verifying apparatus 107 acquires a character string at a first row of the edit information (S2802). Information regarding a software program is described at the first row of the edit information. Upon acquiring the character string, the still image verifying apparatus 107 sets the software program corresponding to the acquired character string as a startup target software program and sets the extracted still image information as an edit target (S2803).

Upon the setting, the still image verifying apparatus 107 sets 2 to a variable i (S2804). The variable i represents a row number of a character string to be read next. Upon the setting, the still image verifying apparatus 107 acquires the character string at the i-th row of the edit information (S2605). Upon acquiring the character string, the still image verifying apparatus 107 determines whether the acquired character string is edit content (S2806). If the acquired character string is not the edit content (no from S2806), the still image verifying apparatus 107 adds the described content of the acquired character string as a process parameter (S2811).

If the acquired character string is not the edit content (yes from S2806), the still image verifying apparatus 107 determines whether a process as an execution target is set (S2807). If a process as an execution target is not set (no from S2807), the still image verifying apparatus 107 sets the described content of the acquired character string as the execution target process (S2810). If a process as an execution target is set (yes from S2807), the still image verifying apparatus 107 performs the execution target process on the edit target in accordance with the startup target software program (S2808). Upon performing the execution target process, the still image verifying apparatus 107 sets a generated image as a new edit target (S2809).

In a specific execution method, the startup target software program may be performed on shell as a function of the operating system (OS) on the still image verifying apparatus 107. If the edit information is the edit information 1101, the still image verifying apparatus 107 executes the following command using the shell:

$>Picture tools version 2.0-crop 400×30+300+300-density 72-scale +20% C:¥Ectract.jpg C:¥Ectract_out.jpg In the above command, "-crop" refers to a command name corresponding to "partial expansion." Also, "400×30+300+300-density 72-scale +20%" represents a character string based on the parameters. "C:¥Ectract.jpg" represents an image prior to the restoration, and "C:¥Ectract_out.jpg" represents an image generated subsequent to the restoration.

Subsequent to one of S2810 and S2811, the still image verifying apparatus 107 determines whether last row of the edit information has been acquired (S2812). If last row of the edit information has not been acquired yet (no from S2812), the still image verifying apparatus 107 increments the variable i (S2813), and returns to S2805. If last row of the edit information has been acquired (yes from S2812), the still image verifying apparatus 107 determines whether the execution target process has been executed (S2814). If the execution target process has not been executed (no from S2814), the still image verifying apparatus 107 performs the execution target process on the edit target in accordance with the startup target software program (S2815). If the execution target process has been executed (yes from S2814), or subsequent to S2815, the still image verifying apparatus 107 outputs the edit target as the decoded still image information (S2816), and ends the generating process of the decoded still image information.

In the flowchart of FIG. 28, the edit information includes the edit content. If the edit information includes the edit content, the still image verifying apparatus 107 starts up the startup target software program described in the edit information. The still image verifying apparatus 107 performs the process of the software program by transmitting an event to the software program in accordance with the described content of the edit information. The content of the event may be related to the operation of the mouse or the keyboard used by the extractor who operates the startup target software program. The digital signature system 100 thus generates the decoded still image information if the OS of the still image verifying apparatus 107 transmits the event to the startup target software program.

Figure 29:
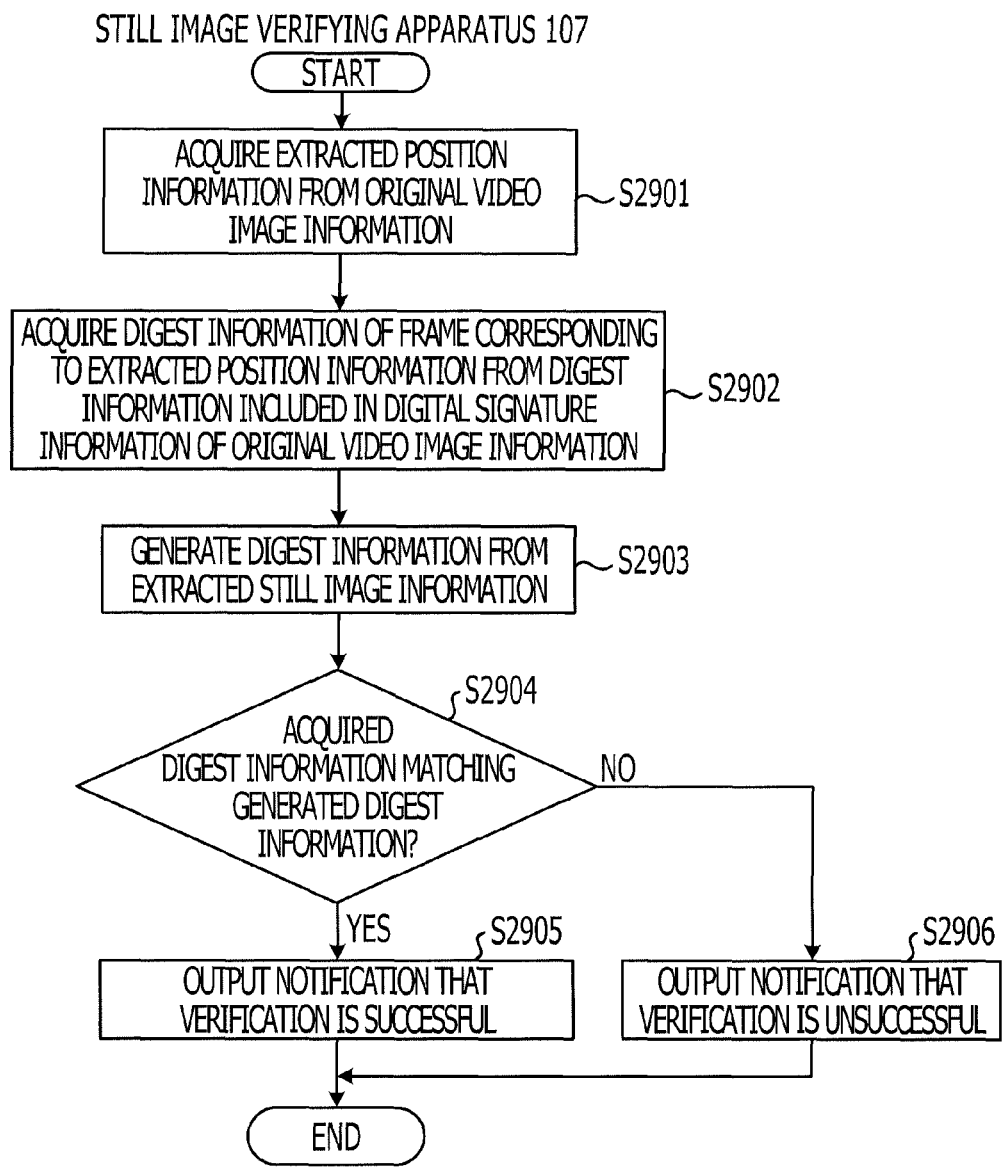
FIG. 29 is a flowchart illustrating an originality partial verification process of edited extracted still image information.

FIG. 29 is a flowchart illustrating the originality partial verification process of the edited still image information. The still image verifying apparatus 107 acquires the extracted position information from the original video image information (S2901). Upon acquiring the extracted position information, the still image verifying apparatus 107 acquires the digest information of the frame corresponding to the extracted position information from the digest information included in the digital signature information of the original video image information (S2902). Upon acquiring the digest information, the still image verifying apparatus 107 generates the digest information from the extracted still image information (S2903).

Upon generating the digest information, the still image verifying apparatus 107 determines whether the acquired digest information matches the generated digest information (S2904). If the acquired digest information matches the generated digest information (yes from S2904), the still image verifying apparatus 107 outputs a notification to the effect that the verification is successful (S2905), and ends the originality partial verification process of the edited still image information. If the acquired digest information fails to match the generated digest information (no from S2904), the still image verifying apparatus 107 outputs a notification to the effect that the verification is not successful (S2906), and then ends the originality partial verification process of the edited extracted still image information.

The still image verifying apparatus, the still image verifying method, and the still image verifying program, designates the edit source image out of the digitally signed video image data, and edit the edit source image, and subsequent to the edit process, map the edited image, the edit source image, the position information of the video image data in the edit source image, and the edit information to each other. During the verification process, the still image verifying apparatus guarantees the authenticity of the edit source image based on the digital signature of the edit source image, the position information and the video image data mapped to each other. Since the edited image is generated from the edit source image and the edit information, the authenticity of the public edited image is guaranteed.

Since the authenticity of the edited image is guaranteed, the edited image is thus free from any alteration. Even if an edit process such as zooming or brightness adjustment is performed on the extracted still image information, it is possible to certify to a third party that the image is free from any alteration.

The still image verifying apparatus may generate an image by encoding, in accordance with an image format, frames including a predictive frame of the inter-frame compressed video image data and a frame on which the predictive frame is based, and may generate the summary information on a per image basis. Even if the video image is inter-frame compressed, the still image verifying apparatus thus certifies to a third party that an image extracted from the video image, even if edited, is free from any alteration.

In the encoding of the frame of the video image in accordance with the image format, the still image verifying apparatus may encode the frame using at least one parameter and generate the summary information on a per image basis. The still image verifying apparatus generates an image with a parameter set therewithin, and then results in a better image that is easy to view and has a smaller data size with the parameter modified. If a process of performing the same edit process on the video image data is repeated, the still image verifying apparatus may set the parameter of the process. If the edit information changes in a process, the extractor may record the edit information during the edit process.

More specifically, the video image data may be data of a video image remaining dark. Brightness may be modified each time of image capturing in such a case. The still image verifying apparatus may set brightness using a parameter. The area of a partial expansion of the generated image may be different each time of image capturing. The still image verifying apparatus may record the partial expansion area as one piece of the edit information when the edit process is performed by the extractor.

In the verification of the edited image as the verification target, the still image verifying apparatus verifies the authenticity of the edit source image in accordance with the edit source image and the position information mapped to the edit source image and the digital signature of the video image data. The still image verifying apparatus then restores the edited image from the edit source image and the edit information, compares the restoration results with the edited image as the verification target, and thus verifies the authenticity of the edited image as the verification target. The still image verifying apparatus may thus certify to a third party that the edited image is the original video image information with part thereof edited, and is free from any alteration. If the edited image is digitally signed, the extractor having edited the image is distinctly known. Even if another third party modifies or adds any alteration to the edited image, it is possible to trace the modification.

The still image verifying apparatus may record, as the edit information, the software program for performing the edit process, the edit process performed by the software program, and the value incidental to the edit process. The still image verifying apparatus may generate a command sentence to the software program from the edit information, and then may generate the edited image by issuing the command sentence.

The still image verifying apparatus may record as the edit information the software program for performing the edit process, and the event transmitted to the software program. The event transmitted to the software program by the mouse or the keyboard matches the edit operation performed on the software program by the extractor. The still image verifying apparatus may record the transmitted event and transmits the event to the software program. The edit operation performed by the extractor may be reproduced. The still image verifying apparatus may generate the edited image.

In the designation of the edit source image, the still image verifying apparatus may generate the still image data based on the video image frame on the video image data. If it is sufficient if only a still image necessary for the still image verification is encoded. The still image verification process is thus performed at high speed.

According to an embodiment, a computer-implemented method includes storing an edit process performed on a selected still image among still images of image data forming an original video image data, performing a restoration of the selected still image using information of the edit process stored including a position of the selected still image within the original video image data and verifying authenticity of an edited image data resulting from the edit process by comparing decoded data generated for the edited image and information stored relative to the original video image data.

According to an embodiment, a method enables selective verification of still image of an original video data by implementing encoding of necessary data without requiring encoding of a large amount of data in its entirely. A method of an embodiment enables selective verification of still image subsequent to implementation of an edit process relative to the still image.

The still image verification process of the embodiment may be executed by causing one of a personal computer and a workstation to execute a prepared still image verification program. The still image verifying program may be stored on one of the computer-readable recording media including a hard disk, a flexible disk, a compact disk-read-only memory (CD-ROM), a magneto-optical disk (MO), and a digital versatile disk (DVD). The still image verifying program is executed by reading the program onto a computer from the recording medium. The still image verifying program may be supplied via a network such as the Internet. The computer-readable recording media include tangible media including the hard disk, the flexible disk, the CD-ROM, the MO, and the DVD. The computer-readable storage medium described in the present invention does not include a transitory transmission medium such as a propagation signal.

Accordingly, the embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention, the scope of which is defined in the claims and their equivalents.

What is claimed is:

1. A still image verifying apparatus, comprising:
a memory;
a processor coupled to the memory and configured to execute a process, the process including:
storing a plurality of pieces of summary information generated respectively from a plurality of pieces of still image data, the plurality of pieces of still image data obtained by encoding a plurality of pieces of image data forming video image data in accordance with an image format;
recording edited image data obtained by performing an edit process on still image data selected from the plurality of pieces of still image data, position information of a still image of the selected still image data relative to the video image data, the selected still image data, and edit information representing content of the edit process;
generating, to implement verification of an authenticity of the edited image data, decoded still image data by retrieving the still image data corresponding to the edited image data and the edit information, and by performing a restoration process on the still image data in accordance with the edit information;
determining whether the generated decoded still image data matches the edited image data as a verification target by comparing the generated decoded still image data with the edited image data;
generating summary information by retrieving from the still image data corresponding to the edited image data as the verification target;
retrieving, in accordance with the position information stored, summary information corresponding to the edited image data guaranteeing originality and comparing the generated summary information with the retrieved summary information to determine whether the generated summary information matches the retrieved summary information; and
verifying the authenticity of the edited image data based on verification results of the retrieving and determination results of the determining.

2. The still image verifying apparatus according to claim 1, wherein the plurality of pieces of image data forming the video image data include an independently replayable video image frame and an independently unreplayable predictive frame.

3. The still image verifying apparatus according to claim 2, wherein the independently unreplayable predictive frame is converted into an independently replayable video image frame and the independently replayable video image frame is encoded into a still image in accordance with the image format.

4. The still image verifying apparatus according to claim 1, wherein the edit information includes a software program for performing the edit process, content of the edit process performed in accordance with the software program, and a set value incidental to the edit process.

5. The still image verifying apparatus according to claim 1, wherein the still image is selected by receiving a designate of a video image frame on the video image data and the still image data is generated based on the designated video image frame.

6. A still image verifying method of a computer for verifying an authenticity of edited image data, comprising:
retrieving still image data corresponding to edited image data as a verification target and edit information in a mapped state, the still image data selected from a plurality of pieces of still image data obtained by encoding a plurality of pieces of image data forming video image data in accordance with an image format, the edited image data obtained by performing an edit process on the selected still image data, position information of a still image of the selected still image data relative to the video image data, and the edit information representing content of the edit process;
performing a restoration process on the still image data in accordance with the retrieved edit information and generating decoded still image data corresponding to the edited image data serving as the verification target;
determining whether the generated decoded still image data matches the edited image data as the verification target by comparing the generated decoded still image data with the edited image data;
generating summary information of the still image data and corresponding to the edited image data as the verification target;
retrieving in accordance with position information recorded, summary information corresponding to the edited image data guaranteeing originality and serving as the verification target, storing a plurality of pieces of summary information generated respectively from the plurality of pieces of still image data;
determining whether the generated summary information matches the retrieved summary information by comparing the generated summary information with the retrieved summary information; and
verifying the authenticity of the edited still image data as the verification target in accordance with verification results of the generated summary information and the retrieved summary information and the comparison results of the decoded still image data with the edited image data as the verification target.

7. The still image verifying method according to claim 6, wherein the plurality of pieces of image data forming the video image data includes an independently replayable video image frame and an independently unreplayable predictive frame.

8. The still image verifying method according to claim 7, wherein the independently unreplayable predictive frame is converted into an independently replayable video image frame and the independently replayable video image frame is encoded into a still image in accordance with the image format.

9. The still image verifying method according to claim 6, wherein the edit information includes a software program for performing the edit process, content of the edit process performed in accordance with the software program, and a set value incidental to the edit process.

10. The still image verifying method according to claim 6, wherein the still image is selected by receiving a designate of a video image frame on the video image data and the still image data is generated based on the designated video image frame.

11. A non-transitory computer-readable recording medium that stores a program causing a computer to perform an operation including verifying an authenticity of edited image data, the method comprising:

retrieving still image data corresponding to edited image data as a verification target and edit information in a mapped state, the still image data selected from a plurality of pieces of still image data obtained by encoding a plurality of pieces of image data forming video image data in accordance with an image format, the edited image data obtained by performing an edit process on the selected still image data, position information of a still image of the selected still image data relative to the video image data, and the edit information representing content of the edit process;

performing a restoration process on the still image data in accordance with the retrieved edit information and generating decoded still image data corresponding to the edited image data serving as the verification target;

determining whether the generated decoded still image data matches the edited image data as the verification target by comparing the generated decoded still image data with the edited image data;

generating summary information of the still image data retrieved from the recording unit and corresponding to the edited image data as the verification target;

retrieving in accordance with position information recorded summary information corresponding to the edited image data guaranteeing originality and serving as the verification target, storing a plurality of pieces of summary information generated respectively from the plurality of pieces of still image data;

determining whether the generated summary information matches the retrieved summary information by comparing the generated summary information with the retrieved summary information; and verifying the authenticity of the edited still image data as the verification target in accordance with the verification results of the generated summary information and the retrieved summary information and the comparison results of the decoded still image data with the edited image data as the verification target.

12. The non-transitory computer-readable recording medium according to claim 11, wherein the plurality of pieces of image data forming the video image data includes an independently replayable video image frame and an independently unreplayable predictive frame.

13. The non-transitory computer-readable recording medium according to claim 12, wherein the independently unreplayable predictive frame is converted into an independently replayable video image frame and the independently replayable video image frame is encoded into a still image in accordance with the image format.

14. The non-transitory computer-readable recording medium according to claim 11, wherein the edit information includes a software program for performing the edit process, content of the edit process performed in accordance with the software program, and a set value incidental to the edit process.

15. The non-transitory computer-readable recording medium according to claim 11, wherein the still image is selected by receiving a designate of a video image frame on the video image data and the still image data is generated based on the designated video image frame.

* * * * *

UNITED STATES PATENT AND TRADEMARK OFFICE
CERTIFICATE OF CORRECTION

PATENT NO.      : 8,761,521 B2
APPLICATION NO. : 13/074432
DATED           : June 24, 2014
INVENTOR(S)     : Takashi Yoshioka It is certified that error appears in the above-identified patent and that said Letters Patent is hereby corrected as shown below:

In the Claims

Column 31, Line 55, in Claim 1, after "retrieving" delete "from".

Column 32, Line 50, in Claim 6, delete "target," insert -- target and --, therefor.

Column 34, Line 4, in Claim 11, delete "target," insert -- target and --, therefor.

Signed and Sealed this
Fourth Day of November, 2014

Michelle K. Lee
*Deputy Director of the United States Patent and Trademark Office*